United States Patent
Mizukura et al.

(10) Patent No.: US 8,325,200 B2
(45) Date of Patent: Dec. 4, 2012

(54) INFORMATION PROCESSING DEVICE AND METHOD, PROGRAM, AND INFORMATION PROCESSING SYSTEM

(75) Inventors: Takami Mizukura, Kanagawa (JP); Naoya Katoh, Chiba (JP)

(73) Assignee: Sony Corporation (JP)

( * ) Notice: Subject to any disclaimer, the term of this patent is extended or adjusted under 35 U.S.C. 154(b) by 1028 days.

(21) Appl. No.: 12/316,375

(22) Filed: Dec. 10, 2008

(65) Prior Publication Data

US 2009/0154798 A1    Jun. 18, 2009

(30) Foreign Application Priority Data

Dec. 13, 2007    (JP) ................ P2007-321582

(51) Int. Cl.
G09G 5/02 (2006.01)
G03F 3/08 (2006.01)
G06K 9/00 (2006.01)

(52) U.S. Cl. ........ 345/590; 345/589; 345/593; 345/602; 358/518; 382/162; 382/167

(58) Field of Classification Search .............. None
See application file for complete search history.

(56) References Cited

U.S. PATENT DOCUMENTS

| | | | |
|---|---|---|---|
| 5,933,253 A | 8/1999 | Ito et al. | |
| 6,301,383 B1 | 10/2001 | Ito et al. | |
| 6,437,792 B1 | 8/2002 | Ito et al. | |
| 6,560,356 B1 | 5/2003 | Takahashi et al. | |
| 6,628,822 B1 | 9/2003 | Nakabayashi et al. | |
| 6,882,445 B1 | 4/2005 | Takahashi et al. | |
| 2002/0149786 A1* | 10/2002 | Hudson et al. | 358/1.9 |
| 2004/0004731 A1* | 1/2004 | Itagaki | 358/1.9 |
| 2005/0253866 A1* | 11/2005 | Kim et al. | 345/594 |
| 2006/0204083 A1* | 9/2006 | Takahashi | 382/162 |
| 2007/0003136 A1* | 1/2007 | Shimbaru | 382/167 |

FOREIGN PATENT DOCUMENTS

| | | |
|---|---|---|
| JP | 5-298437 A | 11/1993 |
| JP | 07-236069 A | 9/1995 |
| JP | 09-098298 A | 4/1997 |
| JP | 10-084487 A | 3/1998 |
| JP | 11-032228 A | 2/1999 |
| JP | 2000-278546 A | 10/2000 |
| JP | 2000-354171 A | 12/2000 |
| JP | 2002-281330 A | 9/2002 |
| JP | 2003-323609 A | 11/2003 |
| JP | 2004-312467 A | 11/2004 |
| JP | 2006-203675 A | 8/2006 |
| JP | 2006-254368 A | 9/2006 |
| JP | 2006-254369 A | 9/2006 |
| JP | 2007-142494 A | 6/2007 |

* cited by examiner

*Primary Examiner* — Tize Ma

(74) *Attorney, Agent, or Firm* — Lerner, David, Littenberg, Krumholz & Mentlik, LLP

(57) ABSTRACT

An information processing device, configured to perform color gamut conversion for compressing or enlarging the color gamut of image data, includes: a selecting unit configured to select a generating method of table information for specifying a non-mapping boundary which is a boundary between a region where the coordinate movement of a pixel to be processed is not performed, and a conversion source region where the coordinate movement of the pixel to be processed is performed, and a mapping limit boundary which is a boundary other than the non-mapping region, of the conversion source region, for each hue, from a plurality of generating methods according to a predetermined condition, with the color gamut conversion; and a table information generating unit configured to generate the table information using the method selected from the plurality of generating methods.

5 Claims, 26 Drawing Sheets

FIG. 4

| INDEX | 0 | 1 | 2 | 3 | 4 |
|---|---|---|---|---|---|
| COLOR GAMUT INFORMATION TO BE IMPLICATED | sRGB | Adobe RGB | Wide RGB | ROMM RGB | DCI |

FIG. 5

| CASE OF sRGB | X | Y |
|---|---|---|
| RED | 0.6400 | 0.3300 |
| GREEN | 0.3000 | 0.6000 |
| BLUE | 0.1500 | 0.0600 |
| WHITE POINT | 0.3127 | 0.3290 |

| REPRESENTATIVE COLOR | Y | C | H |
|---|---|---|---|
| MAGENTA | 0.412 | 0.532 | 52 |
| RED | 0.300 | 0.525 | 108 |
| YELLOW | 0.885 | 0.505 | 171 |
| GREEN | 0.588 | 0.532 | 232 |
| CYAN | 0.699 | 0.525 | 288 |
| BLUE | 0.115 | 0.506 | 351 |

| REPRESENTATIVE COLOR | Y | Cb | Cr |
|---|---|---|---|
| MAGENTA | 0.412 | 0.328 | 0.419 |
| RED | 0.300 | −0.162 | 0.499 |
| YELLOW | 0.885 | −0.499 | 0.079 |
| GREEN | 0.588 | −0.328 | −0.419 |
| CYAN | 0.699 | 0.162 | −0.499 |
| BLUE | 0.115 | 0.499 | −0.079 |

| H | Y | C |
|---|---|---|
| 0 | 0.159 | 0.474 |
| 1 | 0.168 | 0.470 |
| 2 | 0.172 | 0.467 |
| 3 | 0.177 | 0.465 |
| 4 | 0.182 | 0.463 |
| 5 | 0.187 | 0.461 |
| : | : | : |
| 354 | 0.132 | 0.493 |
| 356 | 0.142 | 0.485 |
| 357 | 0.148 | 0.482 |
| 358 | 0.153 | 0.479 |
| 359 | 0.156 | 0.476 |
| 360 | 0.159 | 0.474 |

| H | Y | C | H |
|---|---|---|---|
| 0 | 0.159 | 0.474 | 0.000 |
| 1 | 0.168 | 0.470 | 0.008 |
| 2 | 0.172 | 0.467 | 0.016 |
| 3 | 0.177 | 0.465 | 0.024 |
| 4 | 0.182 | 0.463 | 0.032 |
| 5 | 0.187 | 0.461 | 0.040 |
| : | : | : | : |
| 355 | 0.137 | 0.487 | −0.043 |
| 356 | 0.142 | 0.485 | −0.034 |
| 357 | 0.148 | 0.482 | −0.025 |
| 358 | 0.153 | 0.479 | −0.017 |
| 359 | 0.156 | 0.476 | −0.008 |
| 360 | 0.159 | 0.474 | 0.000 |

FIG. 14
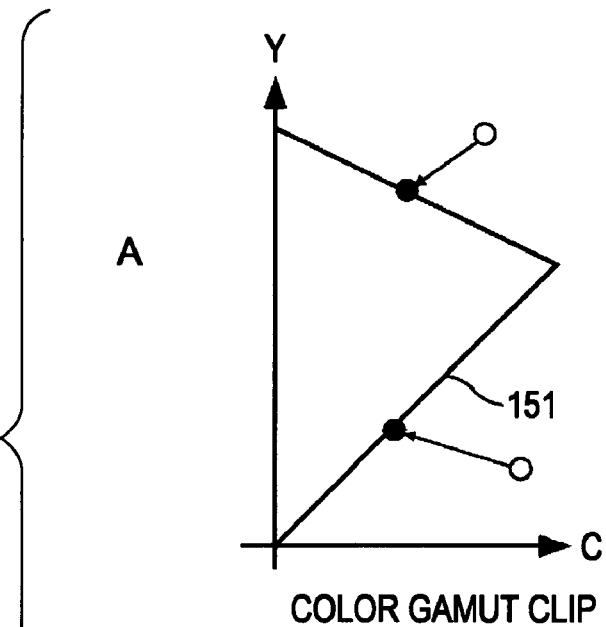
COLOR GAMUT CLIP
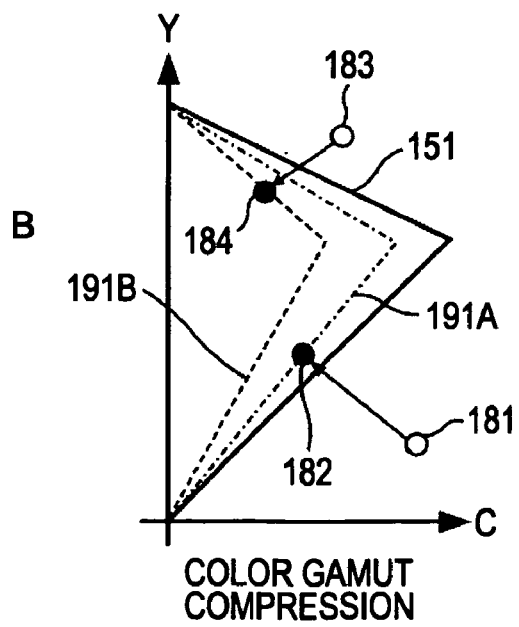
COLOR GAMUT COMPRESSION

FIG. 26
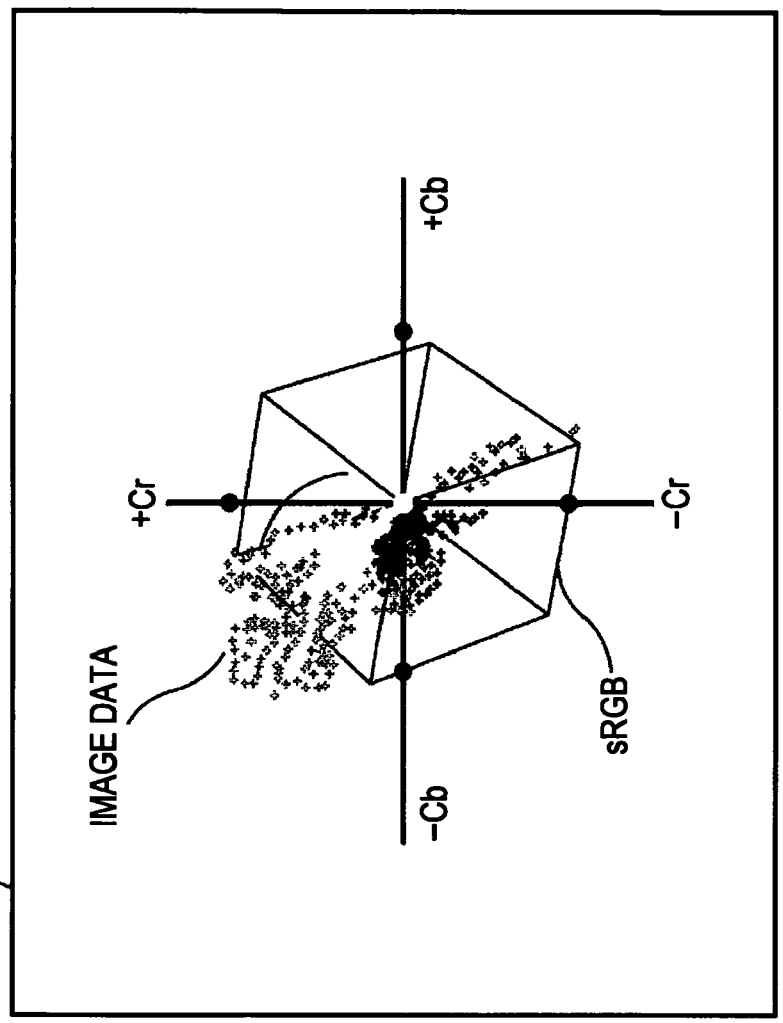
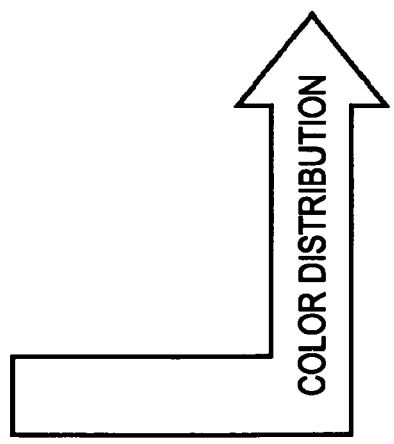
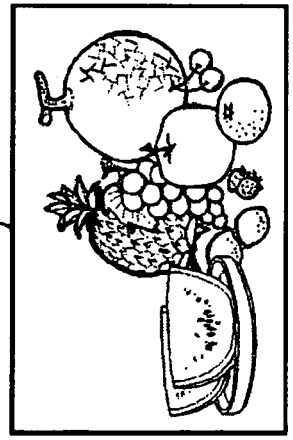

INFORMATION PROCESSING DEVICE AND METHOD, PROGRAM, AND INFORMATION PROCESSING SYSTEM

CROSS REFERENCES TO RELATED APPLICATIONS

The present application claims priority from Japanese Patent Application No. JP 2007-321582, filed in the Japanese Patent Office on Dec. 13, 2007, the entire content of which is incorporated herein by reference.

BACKGROUND OF THE INVENTION

1. Field of the Invention

The present invention relates to an information processing device and method, program, and information processing system, and particularly relates to an information processing device and method, program, and information processing system whereby color gamut conversion is performed appropriately in various conditions.

2. Description of the Related Art

In recent years, various types of digital image displays of which the color expression regions differ have been increased. In particular, color gamut enlargement of image display devices is remarkable, and a color gamut has been markedly enlarged with a process from a CRT (Cathode Ray Tube) display, plasma display, LCD (Liquid Crystal Display), and further to organic Electro Luminescence Display (OELD). Also, a great number of imaging apparatuses, such as digital cameras, video cameras, and so forth, which can image-capture colors other than SRGB (standard RGB), have appeared, and there has been demanded a method for outputting wide color gamut image data smoothly to various color gamut devices including a wide color gamut display by suppressing out of color registration, and high-luminance/high-saturation hue shift.

The following three methods can be exemplified as a principal color matching method for solving a problem of out of color registration between devices.

First, there is a method employing an ICC (International Color Consortium) profile. The ICC profile is a file wherein the properties of an image device defined by an organization called ICC are described, and usually, when outputting a single image file, there are employed two profiles of an input device ICC profile, and an output device ICC profile. There are many cases wherein an input device ICC profile is embedded in an image file, and when outputting the image thereof to another device through a PC (Personal Computer), an application which supports an ICC profile on the PC employs the ICC profile to perform color gamut matching appropriately, and outputs the image. With this method, it is a premise to perform image processing conversion employing a PC, or to support an ICC profile at an output device side.

Also, there is a method employing SRGB space as a system for matching colors without having a consciousness of a color gamut difference between devices. The sRGB is International Standard of color space which the IEC (International Electrotechnical Commission) devised in October, 1998, wherein the color space was devised to ensure color reproducibility between different environments such as difference in devices such as displays, printers, and so forth based on the color gamut of a CRT display. For example, if all of a digital camera, personal computer, display, and printer are compatible with SRGB, when displaying a shot image on the display or printing this, color appearances can be matched without subjecting this to any particular processing. With regard to the SRGB, passing through a PC is not indispensable, and the processing is markedly simple and convenient as compared to a workflow based on an ICC profile, but the color range which can be expressed is narrower than that of other space, so emerald green, dark cyan, orange, bright red, yellow, and so forth are difficult to be expressed. Therefore, the SRGB is unsuitable for professional use wherein a photo and graphic design are handled professionally.

Further, there has been a tendency wherein the Exif (Exchangeable image file format) standard is employed to realize color matching with the printer industry as the center. The Exif, which the JEITA (Japan Electronics and Information Technology Industries Association) proposed and devised, is a format standard for recording an image file. Most digital camera makers employs this format along with the DCF (Design rule for Camera file system) which is a file system standard. Specifically, color space can be described as the header information of an image file, so the printer side can perform color conversion into a printer color gamut more suitably by reading this header information. Particularly, with the Exif ver. 2.21, in addition to the SRGB supported by the former versions, the Adobe RGB of which the color gamut is wider than that of the sRGB, which has been employed normally with the business field such as printing industry, can be employed as supported color space, whereby printable emerald green and dark cyan, which have not been able to express with SRGB according to the related art, can be expressed. The workflow to perform printing employing the Exif standard is called as ExifPrint. This can be realized if the printer side includes a function for reading an Exif header, thereby enabling printing by inserting a memory card into a printer without passing through a PC. There is the PIM (PRINT Image Matching) standard similar to this Exif.

However, for example, in the case of employing an ICC profile, the ICC profile has to be embedded in an image file, and accordingly, there is a possibility that the size of the image file becomes unnecessarily great. Also, a PC application or output device side has to generate a CMM (Color Matching Module) for reading the ICC profile to subject this to suitable processing, but this CMM is generated according to each company's own concept, so even though color matching of the color gamut of the common portion of input and output devices is ensured, colors other than the mutual color gamut are not taken into consideration so much, and accordingly, with regard to high/low luminance and high-saturation colors, hue shift frequently occurs according to natural clip.

The natural clip means a phenomenon wherein colors other than the color gamut of image data externally supplied are represented forcibly with a color within the color gamut of the device. For example, in a case wherein only the R component of a certain color represented with RGB is greater than the maximum value of the R component of the color gamut, the R component of the color thereof is represented with the maximum value of the R component of the color gamut (natural clip). At this time, the balance the RGB of the original color is disrupted according to this natural clip, and the hue is changed. Such change in hue is referred to as hue shift. That is to say, the original color is expressed with a color different from the original color, so occurrence of such hue shift is unfavorable.

Also, for example, in the case of employing the sRGB, an assumed color gamut is a CRT monitor for standard PC, so the color gamut is narrow. There is provided no processing for performing color gamut compression between devices with the workflow of the sRGB, so natural clip occurs regarding colors other than the color gamut of the SRGB, and hue shift occurs regarding high/low luminance and high-saturation colors. Therefore, employing the SRGB may prevent dark cyan and green colors which can be printed with a common printer, or red or the like which can be displayed with an LCD of which the color gamut has been expanded remarkably in recent years from being expressed appropriately.

Further, in the case of a method employing the PIM or Exif, an output device has to perform processing according to the image header information defined by the Exif or PIM, and accordingly, there is a possibility that the processing load at the output device side gets greater. Also, the content of the processing depends on the output device, and accordingly, there is a possibility that color reproducibility intended with the input device is not ensured.

Also, all of the above-mentioned methods are methods for processing still images principally, and are not suitable for color matching of a movement image employing real time processing.

Therefore, in order to realize a substantial color reproducibility technique which does not depend on devices, there has been conceived a method for performing color matching appropriately between devices.

For example, with a method disclosed in Japanese Unexamined Patent Application Publication No. 09-098298 (U.S. Pat. No. 5,933,253), the color reproducibility region of an input system are divided into four regions by employing two straight lines on a two-dimensional plane, and the compression direction is changed for each of the regions, thereby performing color gamut compression.

Also, for example, with a method disclosed in Japanese Unexamined Patent Application Publication No. 07-236069, only the chromaticity coordinates of eight points of representative colors red (R), green (G), magenta (M), yellow (Y), black (K), and white (W) are exchanged, and the conversion of intermediate colors are performed according to the conversion results of the representative eight colors.

There has been conceived such a color gamut conversion algorithm variously other than the abovementioned methods.

SUMMARY OF THE INVENTION

However, a device which performs color gamut conversion does not recognize what kind of color gamut a device has which generates image data to be processed. Thus, in a case wherein the original color gamut is unknown, there is a possibility that color gamut conversion will not be performed appropriately.

There has been recognized demand to enable color gamut conversion to be performed appropriately with more various conditions by selecting a color gamut conversion method appropriately according to conditions.

With an embodiment of the present invention, an information processing device configured to perform color gamut conversion for compressing or enlarging the color gamut of image data, includes: a selecting unit configured to select a generating method of table information for specifying a non-mapping boundary which is a boundary between a region where the coordinate movement of a pixel to be processed is not performed, and a conversion source region where the coordinate movement of the pixel to be processed is performed, and a mapping limit boundary which is a boundary other than the non-mapping region, of the conversion source region, for each hue, from multiple generating methods according to a predetermined condition, with the color gamut conversion; and a table information generating unit configured to generate the table information using the method selected from the multiple generating methods.

The table information generating unit may include at least first table information generating unit configured to generate the table information based on an original color gamut which is the color gamut of the image data before the color gamut conversion, and a target color gamut which is the color gamut of the image data after the color gamut conversion.

The table information generating unit may include at least second table information generating unit configured to set an original color gamut to a color distribution which can be sensed by human eyes, and generate the table information based on the original color gamut which has been set, and a target color gamut which is the color gamut of the image data after the color gamut conversion.

The table information generating unit may include at least third table information generating unit configured to analyze the color distribution of the image data, set the original region to the obtained color distribution, and generate the table information based on the original color gamut which has been set, and a target color gamut which is the color gamut of the image data after the color gamut conversion.

The table information generating unit may include at least constant setting unit configured to set each of the non-mapping region and the mapping limit region to a predetermined value which is common to all of hues.

The information processing device further may further include: a transform function defining unit configured to define a transform function wherein a situation of the color gamut conversion is converted into a function; a virtual clip boundary determining unit configured to determine a virtual clip boundary which is a boundary serving as a candidate of the coordinate movement destination of the pixel to be processed; and a mapping processing unit configured to dispose the pixel to be processed on the virtual clip boundary which has been determined.

With an embodiment of the present invention, an information processing method for performing color gamut conversion for compressing or enlarging the color gamut of image data, includes the steps of: selecting a generating method of table information for specifying a non-mapping boundary which is a boundary between a region where the coordinate movement of a pixel to be processed is not performed, and a conversion source region where the coordinate movement of the pixel to be processed is performed, and a mapping limit boundary which is a boundary other than the non-mapping region, of the conversion source region, for each hue, from multiple generating methods according to a predetermined condition, with the color gamut conversion; and generating the table information using the method selected from the multiple generating methods.

With an embodiment of the present invention, a program causing a computer to execute an information processing method for performing color gamut conversion for compressing or enlarging the color gamut of image data, includes the steps of: selecting a generating method of table information for specifying a non-mapping boundary which is a boundary between a region where the coordinate movement of a pixel to be processed is not performed, and a conversion source region where the coordinate movement of the pixel to be processed is performed, and a mapping limit boundary which is a boundary other than the non-mapping region, of the conversion source region, for each hue, from multiple generating methods according to a predetermined condition, with the color gamut conversion; and generating the table information using the method selected from the multiple generating methods.

According to the above configurations, with the color gamut conversion, a generating method of table information for specifying a non-mapping boundary which is a boundary between a region where the coordinate movement of a pixel to be processed is not performed, and a conversion source region where the coordinate movement of the pixel to be processed is performed, and a mapping limit boundary which is a boundary other than the non-mapping region, of the conversion source region, for each hue is selected from multiple generating methods according to a predetermined condition, and the table information is generated by using the method selected from the multiple generating methods.

With an embodiment of the present invention, an information processing system in which a supply-side device transmits image data to an obtaining-side device, and performs color gamut conversion for compressing or enlarging the color gamut of the image data, the supply-side device includes a supplying unit configured to supply the image data to the obtaining-side device, and the obtaining-side device includes an obtaining unit configured to obtain the image data supplied from the supply-side device, a selecting unit configured to select a generating method of table information for specifying a non-mapping boundary which is a boundary between a region where the coordinate movement of a pixel to be processed is not performed, and a conversion source region where the coordinate movement of the pixel to be processed is performed, and a mapping limit boundary which is a boundary other than the non-mapping region, of the conversion source region, for each hue, from multiple generating methods according to a predetermined condition, with the color gamut conversion, a table information generating unit configured to generate the table information using the method selected from the multiple generating methods, and a color gamut conversion unit configured to perform the color gamut conversion of the image data using the table information which has been generated.

According to the above configuration, with an information processing system in which a supply-side device transmits image data to an obtaining-side device, and performs color gamut conversion for compressing or enlarging the color gamut of the image data, and with the supply-side device, the image data is supplied to the obtaining-side device, and with the obtaining-side device, the image data supplied from the supply-side device is obtained, a generating method of table information for specifying a non-mapping boundary which is a boundary between a region where the coordinate movement of a pixel to be processed is not performed, and a conversion source region where the coordinate movement of the pixel to be processed is performed, and a mapping limit boundary which is a boundary other than the non-mapping region, of the conversion source region, for each hue is selected from multiple generating methods according to a predetermined condition, with the color gamut conversion, and the table information is generated by using the method selected from the multiple generating methods, the color gamut conversion of the image data is performed by using the table information which has been generated.

With an embodiment of the present invention, an information processing system in which a supply-side device transmits image data to an obtaining-side device, and performs color gamut conversion for compressing or enlarging the color gamut of the image data, the supply-side device includes a selecting unit configured to select a generating method of table information for specifying a non-mapping boundary which is a boundary between a region where the coordinate movement of a pixel to be processed is not performed, and a conversion source region where the coordinate movement of the pixel to be processed is performed, and a mapping limit boundary which is a boundary other than the non-mapping region, of the conversion source region, for each hue, from multiple generating methods according to a predetermined condition, with the color gamut conversion, a table information generating unit configured to generate the table information using the method selected from the multiple generating methods, a color gamut conversion unit configured to perform the color gamut conversion of the image data using the table information which has been generated, and a supplying unit configured to supply the image data subjected to color gamut conversion to the obtaining-side device, and the obtaining-side device includes an obtaining unit configured to obtain the image data subjected to color gamut conversion, supplied from the supply-side device.

According to the above configuration, with an information processing system in which a supply-side device transmits image data to an obtaining-side device, and performs color gamut conversion for compressing or enlarging the color gamut of the image data, and with the supply-side device, a generating method of table information for specifying a non-mapping boundary which is a boundary between a region where the coordinate movement of a pixel to be processed is not performed, and a conversion source region where the coordinate movement of the pixel to be processed is performed, and a mapping limit boundary which is a boundary other than the non-mapping region, of the conversion source region, for each hue is selected from multiple generating methods according to a predetermined condition, with the color gamut conversion, and the table information is generated by using the method selected from the multiple generating methods, the color gamut conversion of the image data is performed by using the table information which has been generated, the image data subjected to color gamut conversion is supplied to the obtaining-side device, and with the obtaining-side device, the image data subjected to color gamut conversion, supplied from the supply-side device is obtained.

The term "network" as used here means an arrangement wherein at least two devices are connected, whereby transmission of information can be performed from a certain device to the other device. The devices which communicate through the network may be separate devices, or may be internal blocks making up one device.

Also, the term "communication" may include not only wireless communication and cable communication but also communication wherein wireless communication and cable communication are mixed, i.e., wireless communication is performed within a certain section, and cable communication is performed within another section. Further, an arrangement may be made wherein communication from a certain device to the other device is performed by cable communication, and communication from the other device to a certain device is performed by wireless communication.

According to embodiments of the present invention, color gamut conversion can be performed. Particularly, color gamut conversion can be performed with more various conditions.

BRIEF DESCRIPTION OF THE DRAWINGS

FIG. 4 is a schematic view illustrating a format example of color gamut information;

FIG. 5 is a schematic view illustrating another format example of color gamut information;

FIGS. 7A and 7B are schematic views illustrating yet another format example of color gamut information;

FIGS. 8A and 8B are schematic views illustrating yet another format example of color gamut information;

FIG. 14 is a schematic view wherein a color gamut clip situation and a color gamut compression situation are compared;

FIG. 26 is a schematic view illustrating a color distribution example of an image;

DESCRIPTION OF THE PREFERRED EMBODIMENTS

Figure 1:
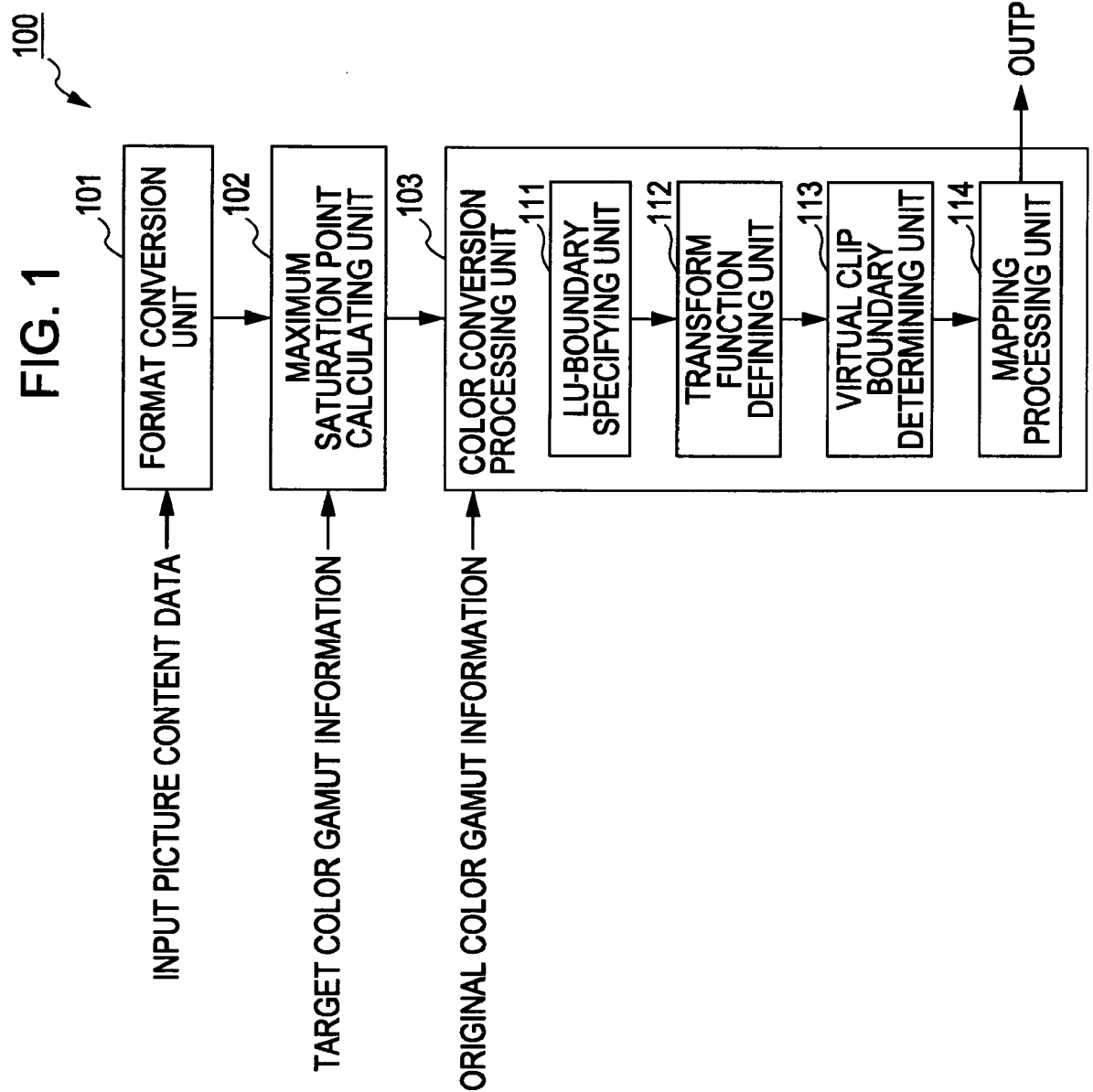
FIG. 1 is a block diagram illustrating a configuration example of a color gamut conversion device to which an embodiment of the present invention has been applied.

FIG. 1 is a block diagram illustrating a principal configuration example of a color gamut conversion device to which an embodiment of the present invention has been applied.

A color gamut conversion device 100 shown in FIG. 1 is an information processing device wherein the color gamut of input picture content data is converted based on original color gamut information and target color gamut information, thereby obtaining output picture content data. The color gamut conversion device 100 includes a format conversion unit 101, maximum saturation point calculating unit 102, and color conversion processing unit 103 as a principal configuration.

The format conversion unit 101 converts input picture content data made up of image data, e.g., from YCC data (Yi, Cbi, Cri) to YCH data (Yi, Ci, Hi) made up of luminance, saturation, and hue so as to prevent hue shift from occurrence due to color gamut conversion. Thus, converting into the YCH data enables color gamut conversion (coordinate movement) to be performed for each hue (on a plane), whereby occurrence of hue shift due to color gamut conversion can be suppressed.

Based on target color gamut information indicating a target color gamut which is the color gamut of the conversion destination of the original color gamut which is a color gamut to which the input picture content data belongs (a color gamut including a color distribution of all of the pixels in the input picture content data, which has been employed for generation of the input picture content data), the maximum saturation point calculating unit 102 calculates all of the YC coordinates information (Ycp, Ccp) of the maximum saturation point for each hue (Hi) (hereafter, also referred to "Cusp point") of the target color gamut thereof. A white point and black point are fixed, so a target color gamut for each hue Hi is determined by determining the Cusp point.

Note that with the present Specification, YC coordinates are represented with (coordinate in the luminance direction (Y), coordinate in the saturation direction (C)). For example, when the YC coordinates of a certain point are (Y1, C1), the coordinate in the luminance (Y) direction of this point is Y1, and the coordinate in the saturation (C) direction is C1.

The color conversion processing unit 103 converts (compresses or enlarges) the color of each pixel of the input picture content data belonging to the original color gamut into a color of the target color gamut to obtain output picture content data. The color conversion processing unit 103 includes an LU-boundary specifying unit 111, transform function defining unit 112, virtual clip boundary determining unit 113, and mapping processing unit 114.

The LU-boundary specifying unit 111 specifies coordinate-conversion (mapping) of which range of a color gamut into which range at the time of color gamut conversion (color gamut compression or color gamut enlargement), i.e., specifies a mapping source region and mapping destination region. The transform function defining unit 112 defines a color gamut conversion function wherein a situation of color gamut conversion is converted into a function. The virtual clip boundary determining unit 113 determines a boundary serving as a movement destination candidate for each pixel to be processed (virtual clip boundary) based on the transform function defined by the transform function defining unit 112. The mapping processing unit 114 performs mapping processing wherein each pixel to be processed is moved (disposed) onto the virtual clip boundary determined by the virtual clip boundary determining unit 113.

Figure 2:
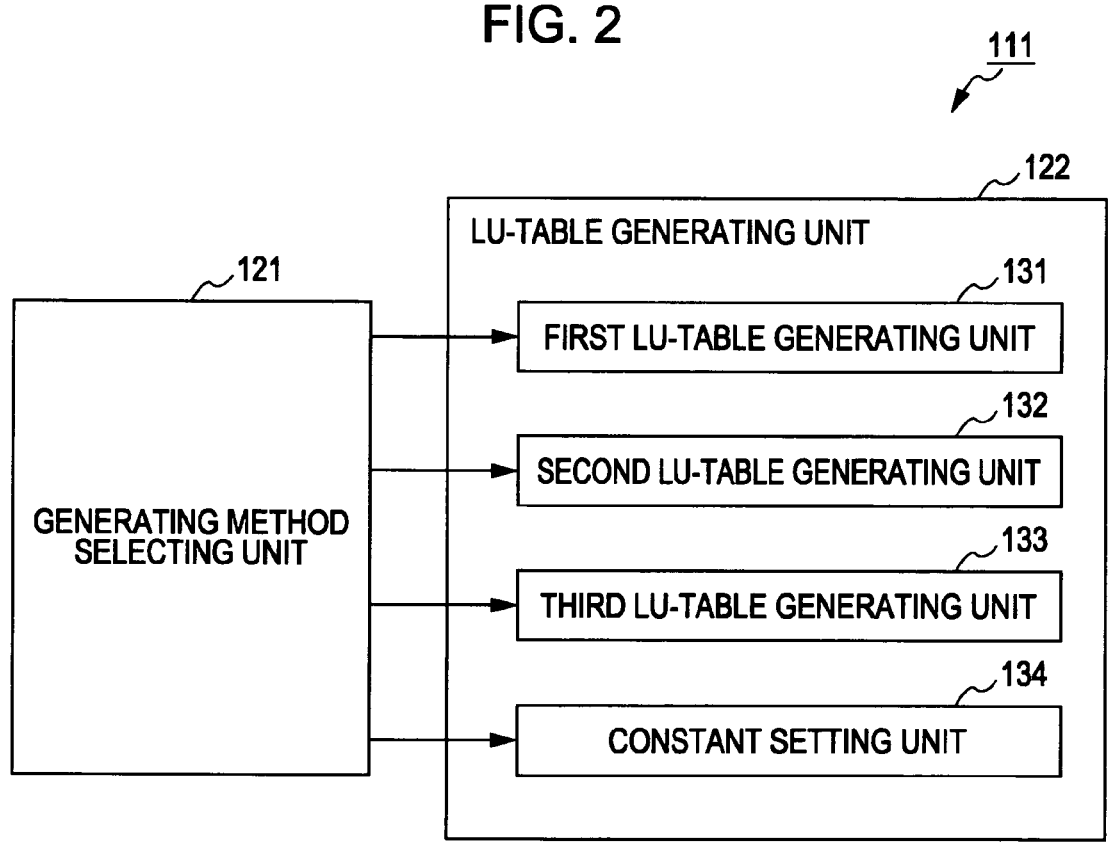
FIG. 2 is a block diagram illustrating a detailed configuration example of an LU-boundary specifying unit.

FIG. 2 is a block diagram illustrating a detailed configuration example of the LU-boundary specifying unit 111 in FIG. 1. As shown in FIG. 2, the LU-boundary specifying unit 111 includes a generating method selecting unit 121, and LU-table generating unit 122. The generating method selecting unit 121 performs selection of an LU table generating method according to the LU-table generating unit 122. The LU-table generating unit 122 generates an LU table by using the method selected by the generating method selecting unit 121.

The LU table is table information representing the values of a non-mapping boundary (U-boundary) and mapping limit boundary (L-boundary) for each hue. The non-mapping boundary (U-boundary) is a boundary between a region where coordinate movement (mapping) of a pixel to be processed is not performed with color gamut conversion, and a region of a conversion source (mapping source) where coordinate movement (mapping) of a pixel to be processed is performed, and the mapping limit boundary (L-boundary) is a boundary other than the non-mapping boundary (U-boundary) of the mapping source region thereof. The details will be described later.

The LU-table generating unit 122 includes a first LU-table generating unit 131, second LU-table generating unit 132, third LU-table generating unit 133, and constant setting unit 134, which generate an LU table by a mutually different method. The first LU-table generating unit 131 generates an LU table based on an original color gamut and target color gamut (first method). The second LU-table generating unit 132 sets a color (optimal color) distribution which can be sensed by human eyes as an original color gamut, thereby generating an LU table (second method). The third LU-table generating unit 133 analyzes the color distribution of image data, sets the distribution thereof as an original color gamut, thereby generating an LU table (third method). The constant setting unit 134 sets the values of the non-mapping boundary (U-boundary) and mapping limit boundary (L-boundary) to a constant which is common to all hues (fourth method). That is to say, in this case, an LU table is generated wherein each of the value of the non-mapping boundary (U-boundary), and the value of the mapping limit boundary (L-boundary) is the same as to all hues.

Next, description will be made regarding a flow example of color gamut conversion processing executed by the color gamut conversion device 100, with reference to the flowchart in FIG. 3. Description will be made with reference to FIGS. 4 through 16, as appropriate.

Upon the color gamut conversion processing being started, in step S101 the format conversion unit 101 performs calculations, for example, such as shown in the following Expressions (1) through (4) so as not to cause hue shift due to color gamut conversion, and converts the format of input content data, for example, from the YCC to YCH (converts the coordinates system from the YCC coordinates to YCH coordinates).

$$Y_i = Y_i \tag{1}$$

$$C_i = \sqrt{Cb_i^2 + Cr_i^2} \tag{2}$$

if $Cr_i > 0$ $$H_i = \arctan\left(\frac{Cr_i}{Cb_i}\right) \times \frac{180}{\pi} \tag{3}$$

else $$H_i = \arctan\left(\frac{Cr_i}{Cb_i}\right) \times \frac{180}{\pi} + 360 \tag{4}$$

Upon the format being converted, in step S102 the maximum saturation point calculating unit 102 calculates the YC coordinates information (Ycp, Ccp) of the maximum saturation point (Cusp point) of each hue Hi based on the target color gamut information.

The target color gamut information and original color gamut information are assumed to be transmitted/received by communication, for example, as the meta data of picture content data. Accordingly, for example, it is very important that the volume of such information is not great, such information can be readily described, and so forth. A specific example will be shown below.

FIG. 4 is a schematic view illustrating a format example of color gamut information. As shown in Table 141 in FIG. 4, several pieces of color gamut information which are frequently used is prepared beforehand, and indexes corresponding thereto are prepared. Only the index numeric value data thereof is transmitted/received by communication, thereby exchanging color gamut data. For example, if color gamut information to be transmitted is implicated beforehand, such as shown in FIG. 4, when desiring to transmit Wide RGB color gamut information, a numeric value "2", alone has to be transmitted. It goes without saying that this index may not be a numeric value, so may be a character such as an alphabet or a symbol, for example.

With this format, communication load can be reduced since the volume of data to be exchanged is small, but it is commonly difficult to define the color gamut inherent in each output device beforehand, and accordingly, exchange of representative color gamut data is performed consistently. Also, a reception side which has obtained an index has to render the received information into color gamut information having a form which can be employed for internal color gamut compression (later-described Cusp table, or the like).

FIG. 5 is a schematic view illustrating another format example of color gamut information. As shown in Table 142 in FIG. 5, in a case wherein a device which desires to express a color gamut is, for example, a display device for displaying an image, there can be calculated a transformation matrix for transforming a color which can be expressed by the display device as long as the color is xy chromaticity data of three primary colors, red, blue, green, and white point into a numeric value of color space which does not depend on any device (XYZ, CIELAB, etc.). That is to say, a color gamut can be defined with RGB. In the case of a display device of three colors or more, a color gamut is chromaticity information of all of the primary colors serving as the basis thereof. This format provides excellent approximation to a display device wherein additive color mixing properties hold, but is employed as approximation regarding other devices. Also, in the same way as the case shown in FIG. 4, the information has to be rendered into color gamut information which can be employed for color gamut compression internally on the reception side (such as a later-described Cusp table).

Figure 6A:
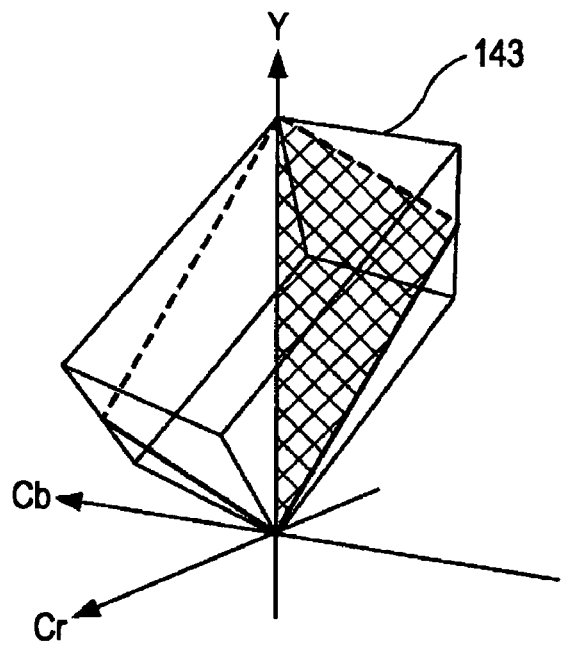
FIGS. 6A and 6B are schematic views illustrating a color gamut example.
Figure 6B:
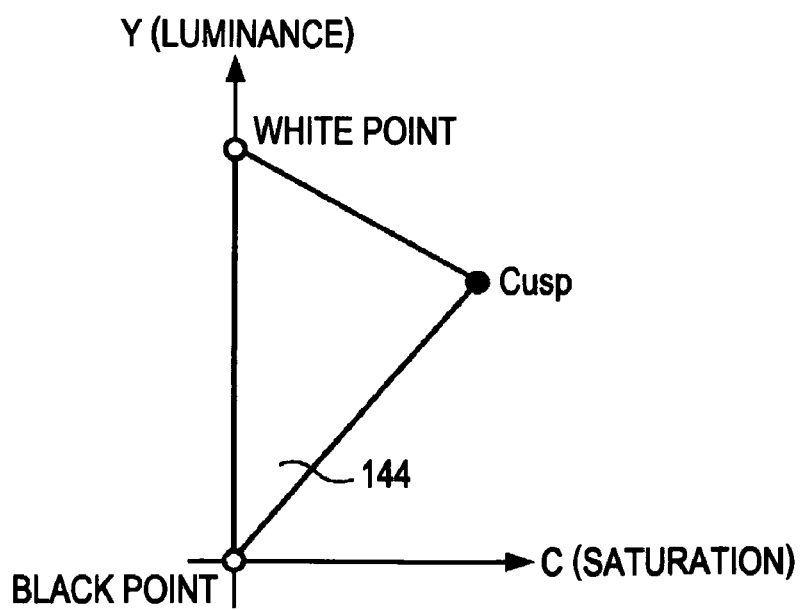

As shown in FIG. 6A, when expressing the color gamut of a certain device with YCC (Y, Cb, Cr) space (color gamut 143), as shown in FIG. 6B, a cut plane cut with an iso-hue plane can be represented with a YC2-dimensional plane wherein the vertical axis is luminance Y, and the horizontal axis is saturation C (color gamut 144). A color gamut shape on this plane can be approximated with a triangle connecting a white point, black point, and Cusp point such as the color gamut 144 shown in FIG. 6B as long as the YC coordinates of the maximum saturation point (Cusp) is understood. The color gamut 143 of the device can be defined approximately by making use of this feature as long as the YC coordinates of the Cusp point (Cusp information) on several representative hue planes is held as a numeric-value table. Such a table of the YC coordinates (Cusp information) of the maximum saturation point (Cusp) of a representative hue is referred to as a Cusp table. The volume of the Cusp table depends on the number of held representative hues, but particularly, the color gamut of a display device or the like can be approximated with sufficient excellent precision by the Cusp table made up of Cusp coordinates regarding six hues of red (R), green (G), blue (B), cyan (C), magenta (M), and yellow (Y).

Table 145 shown in FIG. 7A and Table 146 shown in FIG. 7B are Cusp tables (representative six hues) of sRGB color gamut in sYCC space. sYCC is luminance color difference separated space derived from RGB defined for high-vision by employing ITU-R BT. 601 which is international standard of a transformation matrix to YCC, and is color space which is wider than sRGB in which the actual situation of the color gamut of the display is reflected, and covers an output-side device such as a printer or the like. The coordinates of the Cusp point in this case (Cusp information) may be represented with YCH (luminance, saturation, hue) coordinates such as shown in Table 145 shown in FIG. 7A, or may be represented with YCbCr (luminance, color difference information) coordinates such as shown in Table 146 shown in FIG. 7B. The Cusp information of hues other than representative hues can be obtained with linear interpolation or the like from the Cusp information of the neighborhood thereof.

The luminance, color difference, hue, saturation information employed here are not restricted to the YCC space, and information conforming to luminance, color difference, hue, saturation information in other luminance and color difference space (e.g., CIELAB, CIELUV, etc.) may be employed.

Note that a hue to be set as a representative hue is arbitrary, and for example, may also be set with a certain hue interval. Table 147 shown in FIG. 8A is a Cusp table which represents Cusp information with the YCH coordinates wherein a representative hue is set for each degree, and Table 148 shown in FIG. 8B is a Cusp table which represents Cusp information with the YCbCr coordinates wherein a representative hue is set for each degree similarly. If an arrangement is made wherein such a Cusp table itself can be exchanged by communication as color gamut information, received color gamut information can be used as is at the time of color gamut compression on the reception side. Also, hues have an equal interval, so a reference method is easy. Such a Cusp table has features wherein if the hue interval is set great, the information volume gets smaller, and if the hue interval is set small, the information volume gets greater. It is desirable to determine the optimal interval while taking load and precision of transmission/reception of information into consideration. Also, when exchanging a Cusp table, handling processing can be readily realized such that hues are thinned out, and are then transmitted depending on a situation. The Cusp information of hues other than representative hues is obtained with linear interpolation or the like from the Cusp information of the neighborhood thereof.

In this case as well, the employed luminance, color difference, hue, saturation information are not restricted to the YCC space, and information conforming to luminance, color difference, hue, saturation information in other luminance and color difference space (e.g., CIELAB, CIELUV, etc.) may be employed.

As described above, an original color gamut and target color gamut can be exchanged in various formats, but for example, in a case wherein target color gamut information is given in a form such as a Cusp table which is table information made up of the YC coordinates of the Cusp point according to representative hues, the maximum saturation point calculating unit 102 employs the Cusp table thereof to calculate the YC coordinates information (Ycp, Ccp) of the Cusp point of a desired hue from the YC coordinates of the Cusp point of a nearby representative hue with linear interpolation or the like. Also, for example, in a case wherein target color gamut information is given with chromaticity information or the like, a Cusp table can be generated from the chromaticity information thereof with internal calculation, and the maximum saturation point calculating unit 102 can also obtain the YC coordinates information (Ycp, Ccp) of the Cusp point with reference to the Cusp table thereof. Upon the YC coordinates of the Cusp point being determined, a color gamut on the YC plane at the hue Hi is determined.

Note that, for example, in a case wherein output picture content data is recorded in a recording medium, when no communication can be performed with an output device for outputting the output picture content data, or when there are multiple devices available as output devices, which have a mutually different color gamut, there are conceived a case wherein the target color gamut information is not obtained, and a case wherein the target color gamut information is not uniquely determined. Thus, in a case wherein a target color gamut is unidentified or undetermined, the maximum saturation point calculating unit 102 may set predetermined color gamut information as tentative target color gamut information, for example. Note that, in this case, it is desirable to employ a common color gamut such as sRGB or sYCC as a color gamut to be set as tentative target color gamut information so as to be compatible with many more devices.

The following processing is performed similarly not only as to target color gamut information but also as to tentative target color gamut information. Accordingly, in the following, target color gamut information and tentative target color gamut information will not be distinguished, and both will be described as target color gamut information unless differentiation is appropriate.

Figure 3:
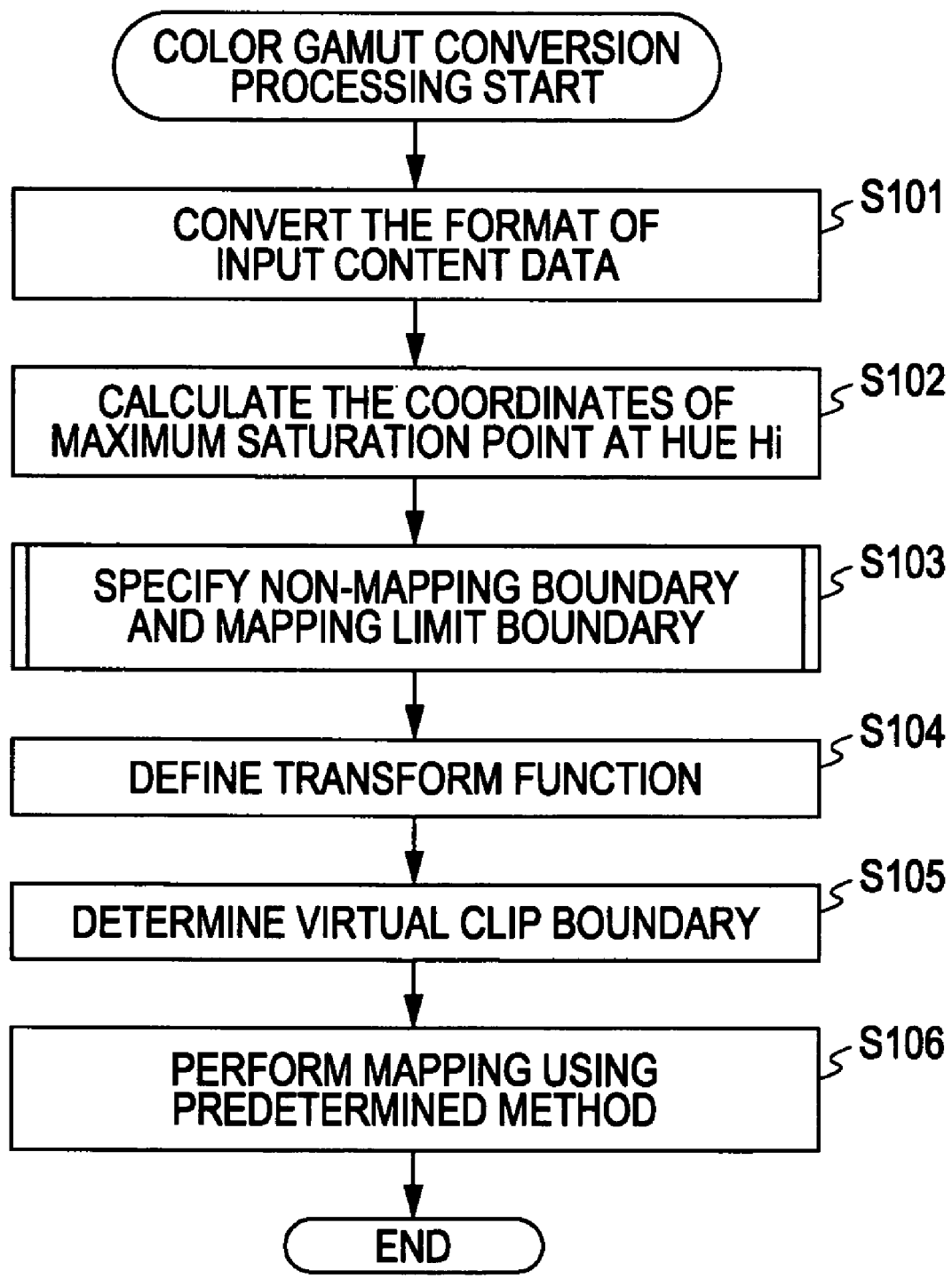
FIG. 3 is a flowchart for describing a flow example of color gamut processing.

Now, description will be back to FIG. 3. In step S103, the LU-boundary specifying unit 111 specifies a non-mapping boundary and mapping limit boundary. Now, attention is paid to a compression ratio in a saturation direction.

Figure 9:
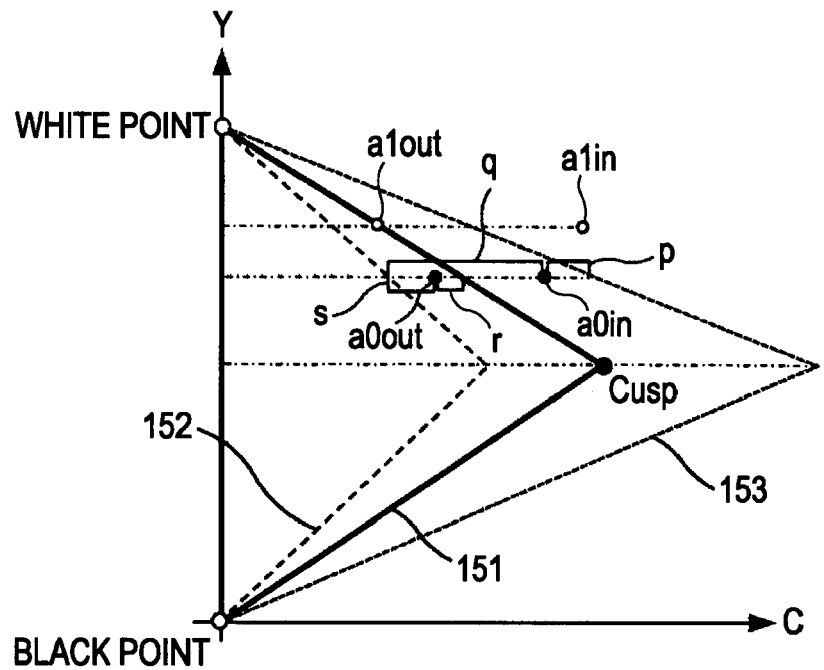
FIG. 9 is a schematic view for describing a situation example of color gamut compression.

FIG. 9 is a schematic view illustrating a situation of color gamut conversion in the case of compressing a color gamut, with color space wherein the vertical axis is taken as a luminance axis (Y axis), and the horizontal axis is taken as a saturation axis (C axis). In FIG. 9, a region surrounded with a thick line (region surrounded with a triangle of which the peaks are a white point, black point, and Cusp point) is a final compression destination region (target compressed area), i.e., a target color gamut. A T-boundary (Target boundary) 151 is an edge (boundary) other than the Y axis of this target region. With the T-boundary 151 as reference, a boundary somewhat smaller in the saturation direction is a non-mapping boundary (U-boundary (Uncompressed boundary)) 152. A region surrounded with the Y axis and the U-boundary 152 is a non-mapping region, and pixels included in this region are not subjected to color gamut compression (coordinate movement). Next, how much region should be compressed into a compression destination region has to be specified. A boundary line for specifying to how much color gamut the color of a picture content is expanded is a mapping limit boundary (L-boundary (Limited boundary)) 153. With color gamut compression, the L-boundary 153 becomes a boundary line enlarged in the saturation direction as compared to the T-boundary 151. That is to say, color gamut compression principally means to compress a region surrounded with the U-boundary 152 and L-boundary 153 into a region surrounded with the U-boundary 152 and T-boundary 151 (i.e., with color space, pixels within a region surrounded with the U-boundary 152 and L-boundary 153 are subjected to coordinate movement within a region surrounded with the U-boundary 152 and T-boundary 151).

When expressing this only in the saturation direction, according to this color gamut compression, the coordinates of a0in in FIG. 9 are moved to a0out, for example. Note that all of the colors having a higher saturation than that of the L-boundary 153 are clipped in the T-boundary 151 (subjected to coordinate movement onto the T-boundary 151). For example, the coordinates of a1in in FIG. 9 are moved to a1out.

Figure 10:
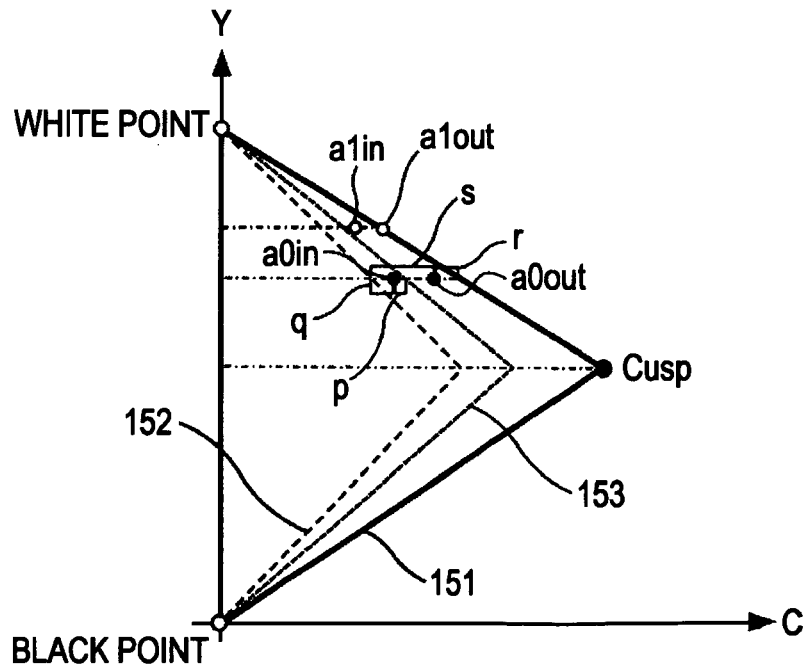
FIG. 10 is a schematic view for describing a situation example of color gamut enlargement.

FIG. 10 is a schematic view illustrating a situation of color gamut conversion in the case of enlarging a color gamut, with color space wherein the vertical axis is taken as a luminance axis (Y axis), and the horizontal axis is taken as a saturation axis (C axis). The case of enlargement differs from the case of compression in that the L-boundary 153 becomes a boundary line reduced in the saturation direction as compared to the T-boundary 151. That is to say, color gamut enlargement means to enlarge a region surrounded with the U-boundary 152 and L-boundary 153 to a region surrounded with the U-boundary 152 and T-boundary 151 (i.e., with color space, pixels within a region surrounded with the U-boundary 152 and L-boundary 153 are subjected to coordinate movement within a region surrounded with the U-boundary 152 and T-boundary 151).

When expressing this only in the saturation direction, according to this color gamut enlargement, the coordinates of a0in in FIG. 10 are moved to a0out, for example. Note that all of the colors having a higher saturation than that of the L-boundary 153 are clipped in the T-boundary 151 (subjected to coordinate movement onto the T-boundary 151). For example, the coordinates of a1in in FIG. 10 are moved to a1out.

The L-boundary 153 and U-boundary 152 are set as a saturation enlargement ratio or saturation reduction ratio when setting the saturation of the T-boundary 151 to "1". There can be conceived various setting methods, but a constant value may be employed regardless of hues, or a setting value may also be changed for each hue.

Note that the details of the LU boundary specifying method will be described later.

Figure 11:
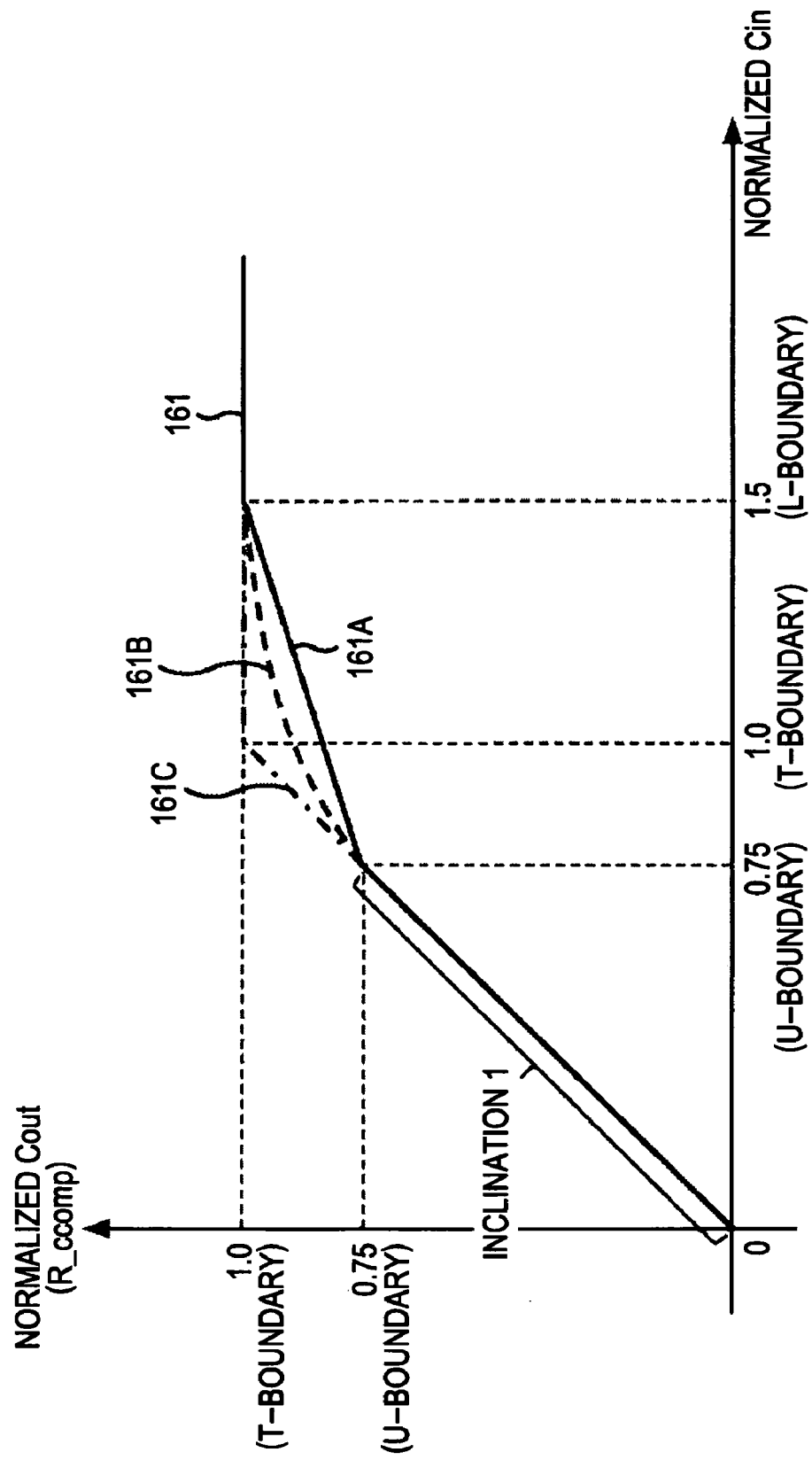
FIG. 11 is a graph illustrating an example of a compressing direction mapping function.
Figure 12:
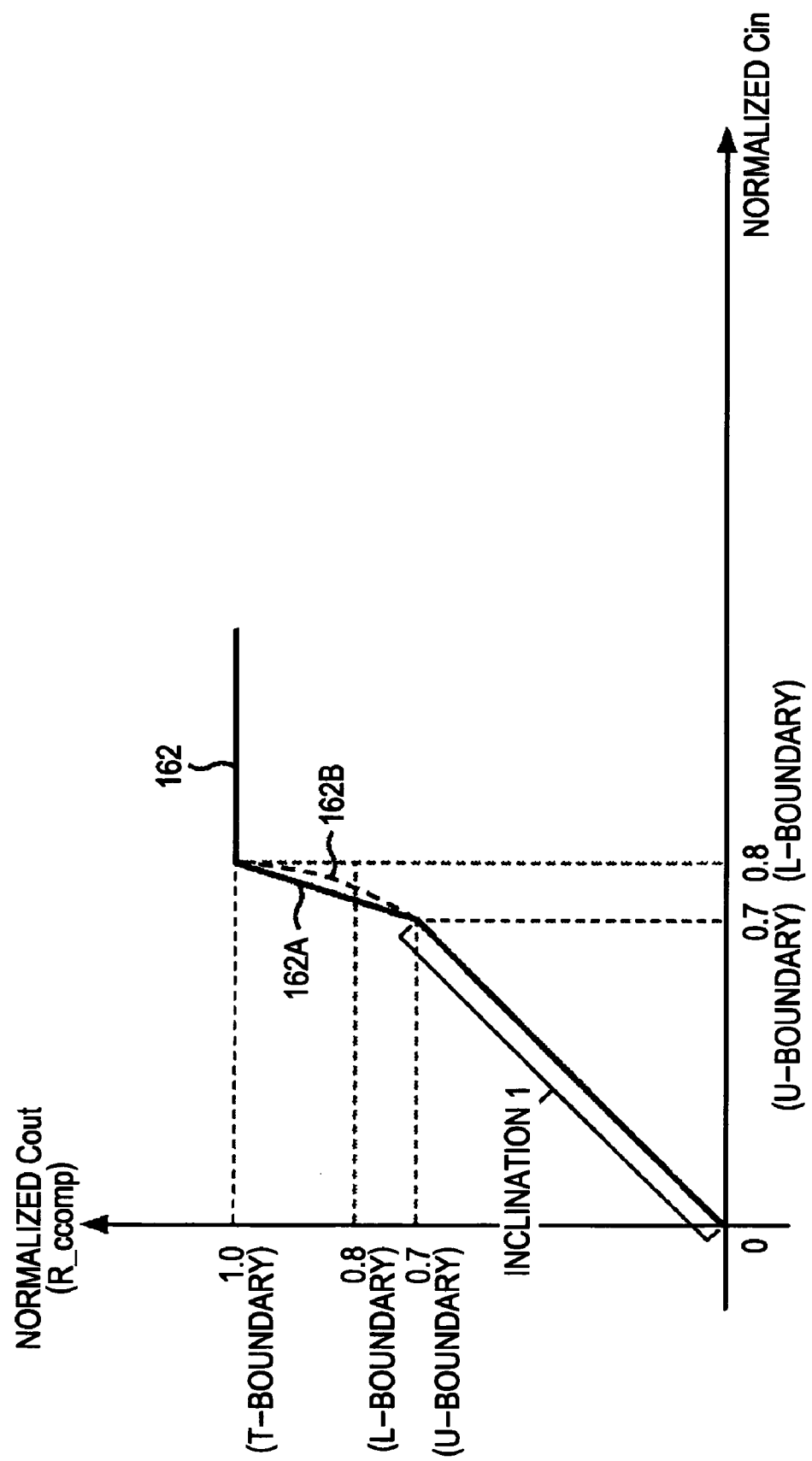
FIG. 12 is a graph illustrating an example of an enlarging direction mapping function.

Now description will be back to FIG. 3. In step S104, the transform function defining unit 112 defines a transform function. Upon a compression situation when assuming that the setting value of the U-boundary 152 is "0.75", and the setting value of the L-boundary 153 is "1.5" being represented with a function, a curve 161 shown in FIG. 11 is obtained. This curve 161 will be referred to as a mapping function. A range of which the inclination is "1" indicates a non-mapping region. Color gamut compression indicates that a range surrounded with the U-boundary 152 and L-boundary 153 on the horizontal axis is compressed to obtain a range surrounded with the U-boundary 152 and T-boundary 151 on the vertical axis. The compression method at this time is arbitrary, and there are conceived various methods. For example, a solid line 161A denotes linear compression. A dashed line 161B is an example wherein the function is bent smoothly so as to be compressed gradually. A single-dot broken line 161C denotes not compression but a color gamut clip as to the T-boundary 151.

That is to say, according to the form of the curve 161 within this range, for example in FIG. 9, there is determined the ratio (r:s) between the distance to the T-boundary 151 and distance to the U-boundary 152 of the a0out which is the movement destination of the a0in wherein the ratio between the distance to the L-boundary 153 and the distance to the U-boundary 152 is p:q. In other words, the function (compression function) indicated with the curve 161 indicates a compression ratio (R_ccomp) in the saturation direction of a certain pixel to be processed, and the virtual clip boundary of the pixel to be processed is determined according to the output value of this function.

The mapping function is determined depending on the values of the L-boundary 153 and U-boundary 152, so if the values of the L-boundary 153 and U-boundary 152 are changed for each hue, the mapping function is also changed. Now, let us say that a numeric value "0.8" which is less than "1.0" is given to the L-boundary 153, and the U-boundary 152 is "0.7", mapping in this case is enlargement processing. The situation of the mapping function in this case is shown in a curve 162 in FIG. 12. In the same way as in the case of the curve 161, a range of which the inclination is "1" denotes a non-mapping region. A solid line 162A means linear enlargement. A dashed line 162B is an example wherein enlargement is performed gradually.

That is to say, according to the form of the curve 162 within this range, for example in FIG. 10, there is determined the ratio (r:s) between the distance to the T-boundary 151 and distance to the U-boundary 152 of the a0out which is the movement destination of the a0in wherein the ratio between the distance to the L-boundary 153 and the distance to the U-boundary 152 is p:q. In other words, the function (enlargement function) indicated with the curve 162 indicates an enlargement ratio (R_ccomp) in the saturation direction of a certain pixel to be processed, and the virtual clip boundary of the pixel to be processed is determined according to the output value of this function.

Now, description will be back to FIG. 3. In step S105, the virtual clip boundary determining unit 113 determines a virtual clip boundary.

Figure 13:
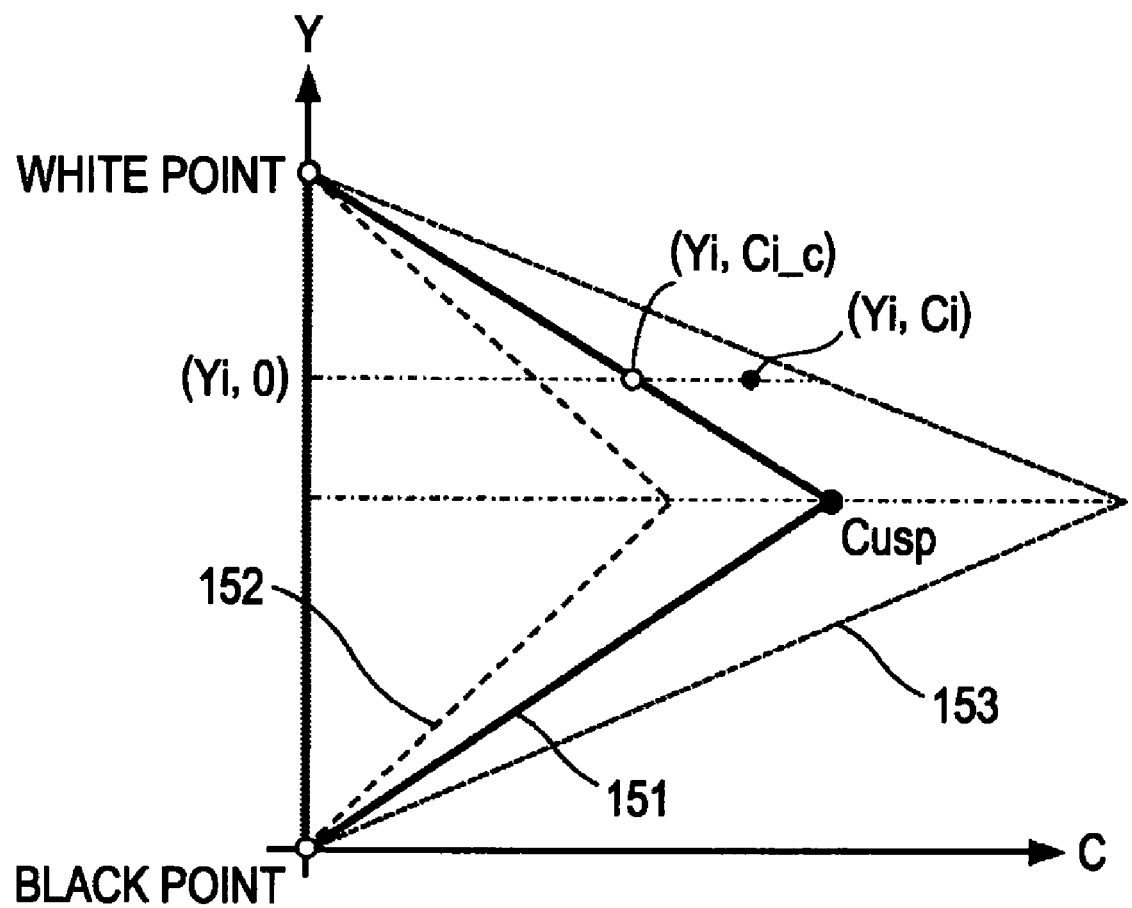
FIG. 13 is a schematic view illustrating a saturation calculation method example.

The virtual clip boundary determining unit 113 employs the saturation Ci of the pixel to be processed to reference the transform function (compression function or enlargement function) defined by the processing in step S104. However, the transform function is a value obtained by normalizing the saturation at the T-boundary 151 with "1", so saturation Ci_c at the T-boundary 151 having the same luminance as that of the pixel to be processed has to be obtained. For example, as shown in FIG. 13, if we say that the YC coordinates of the pixel to be processed is (Yi, Ci), the saturation Ci_c at the T-boundary 151 having the same luminance as that of the pixel to be processed can be obtained as the saturation of an intersection point between a straight line connecting a white point and Cusp point, and a straight line connecting the pixel to be processed (Yi, Ci) and the luminance point (Yi, 0) of the pixel to be processed on the Y axis.

Saturation Ci_norm for referencing the compression function can be calculated such as shown in the following Expression (5) by employing the saturation Ci_c of this intersection point and the saturation Ci_c of the pixel to be processed.

$$Ci\_norm = \frac{Ci}{Ci\_c} \quad (5)$$

For example, the virtual clip boundary determining unit 113 employs this saturation Ci_norm to reference the compression function indicated by the curve 161 in FIG. 11, and determines the compression ratio R_ccomp in the saturation direction of the pixel to be processed. Upon the R_ccomp being determined, the virtual clip boundary (V-boundary (Virtual clip boundary)) of the pixel to be processed can be determined. Thus, the virtual clip boundary (V-boundary) is determined, whereby color gamut compression can be conceived as processing for repeatedly performing color gamut clip.

A in FIG. 14 is a schematic view illustrating a color gamut clip situation. Color gamut clip denotes, as shown in A in FIG. 14, that a color outside the target color gamut is moved onto the T-boundary 151 which is the boundary of the target color gamut (clipped in the T-boundary 151). For example, in A in FIG. 14, a pixel to be processed shown in a white circle is subjected to coordinate movement to a clip point on the T-boundary 151 shown in a filled circle.

B in FIG. 14 is a schematic view illustrating a color gamut compression situation. As described above, color gamut compression means to move a pixel to be processed onto the virtual clip boundary (V-boundary) corresponding to the pixel to be processed thereof. For example, in B in FIG. 14, a pixel to be processed 181 is subjected to coordinate movement to a clip point 182 on a V-boundary 191A, and a pixel to be processed 183 is subjected to coordinate movement to a clip point 184 on a V-boundary 191B. That is to say, color gamut compression can be regarded as equivalent to performing the same processing as that in the case of a color gamut clip in A in FIG. 14 for each pixel to be processed.

For example, upon description being made regarding the Cusp point, the YC coordinates (Ycp, Ccp_V) of a clip point Cusp_V of the Cusp point of the YC coordinates (Ycp, Ccp) can be calculated such as the following Expression (6) by employing the compression ratio R_ccomp in the saturation direction.

$$Cusp\_V=(Ycp, Ccp\_V)=(Ycp, R\_ccomp \times Ccp) \quad (6)$$

Figure 15:
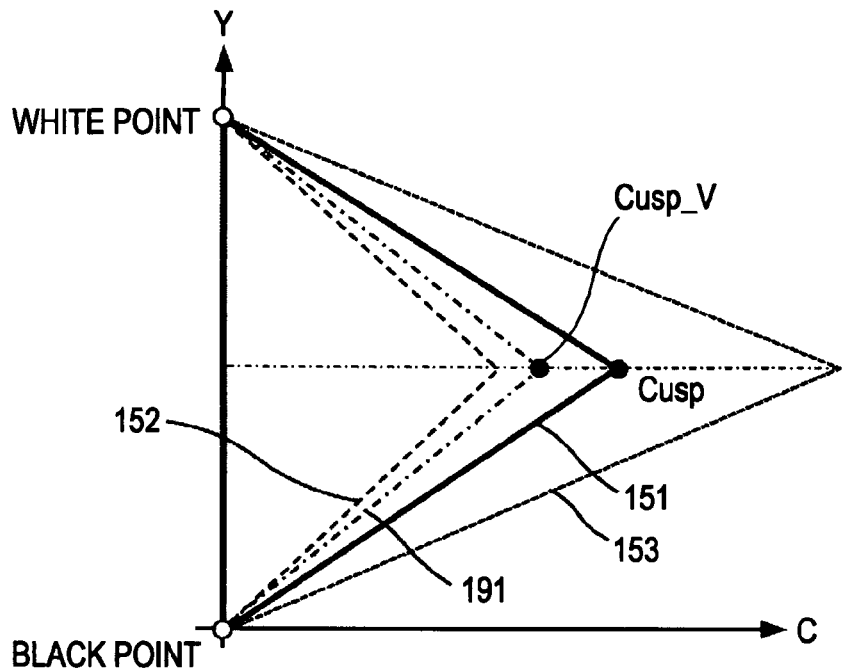
FIG. 15 is a schematic view illustrating a virtual clip boundary example.

A virtual clip boundary (V-boundary) 191 is determined from the YC coordinates of the clip point Cusp_V. For example, as shown in FIG. 15, the virtual clip boundary (V-boundary) 191 of the Cusp point is made up of a line segment with the clip point Cusp_V and a white point as both ends, and a line segment with the clip point Cusp_V and a black point as both ends.

That is to say, the V-boundary 191 is determined with the above-mentioned compression function, and the ratio (p:q) between the distance to the L-boundary 153 and the distance to the U-boundary 152 of a pixel to be processed. In other words, pixels to be processed having the same ratio (p:q) between the distance to the L-boundary 153 and the distance to the U-boundary 152 share the V-boundary 191.

Note that description has been made so far regarding the case of compressing a color gamut, but the method for determining the V-boundary 191 in the case of enlarging a color gamut is basically the same as that in the case of compressing a color gamut.

Figure 16:
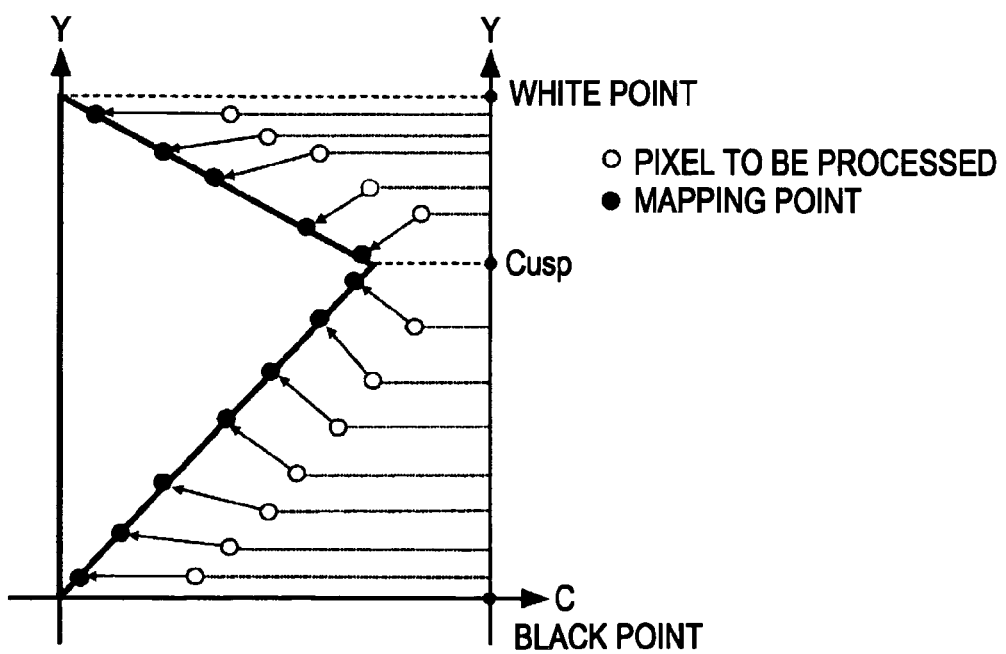
FIG. 16 is a schematic view illustrating a mapping example.

Now, description will be back to FIG. 3. In step S106, the mapping processing unit 114 subjects each pixel to be processed to mapping (coordinate movement) onto the V-boundary 191 corresponding to each pixel to be processed, determined such as described above, e.g., such as shown in FIG. 16, by using a predetermined method. In FIG. 16, white circles denote pixels to be processed, and filled circles denote mapping points. That is to say, the mapping processing unit 114 determines where a pixel to be processed is moved on the V-boundary 191 corresponding to the pixel to be processed thereof. Note that there are various methods as this mapping method, and any method may be employed. In general, in a case wherein the luminance Y of a pixel to be processed is in the vicinity of a white point or black point, it is desirable to increase the compression (or enlargement) ratio in the saturation direction, and in a case wherein the luminance Y of a pixel to be processed is in the vicinity of the Cusp point, it is desirable to increase the compression (or enlargement) ratio in the luminance direction.

Upon the processing in step S106 being ended, the color gamut conversion device 100 ends the color gamut conversion processing.

As described above, the color gamut conversion device 100 converts a color gamut from an original color gamut to a target color gamut appropriately.

Next, a flow example of the LU-boundary specifying processing for specifying a non-mapping boundary and mapping limit boundary, executed in step S103 in FIG. 3 will be described with reference to the flowchart in FIG. 17.

In step S121, the generating method selecting unit 121 determines whether or not the original color gamut information has been known. In a case wherein the original color gamut information has been obtained, and determination is made that the original color gamut information has been known, the generating method selecting unit 121 advances the processing to step S122. In step S122, the first LU-table generating unit 131 generates an LU table by using the first method. The details of the processing in step S122 will be described later. Upon the processing in step S122 being ended, the LU-boundary specifying processing is ended, the processing is returned to step S103 in FIG. 3, and the processing in step S104 and thereafter are executed.

Also, in a case wherein determination is made in step S121 that the original color gamut information has not been obtained, and determination is made that the original color gamut information has not been known, the generating method selecting unit 121 advances the processing to step S123, and determines whether or not the input picture content data is shot image data. In a case wherein determination is made that the input picture content data is shot image data, i.e., image data shot and obtained by a shooting device, the generating method selecting unit 121 advances the processing to step S124.

In step S124, the second LU-table generating unit 132 generates an LU table by using the second method. The details of the processing in step S124 will be described later. Upon the processing in step S124 being ended, the LU-boundary specifying processing is ended, the processing is returned to step S103 in FIG. 3, and the processing in step S104 and thereafter are executed.

Figure 17:
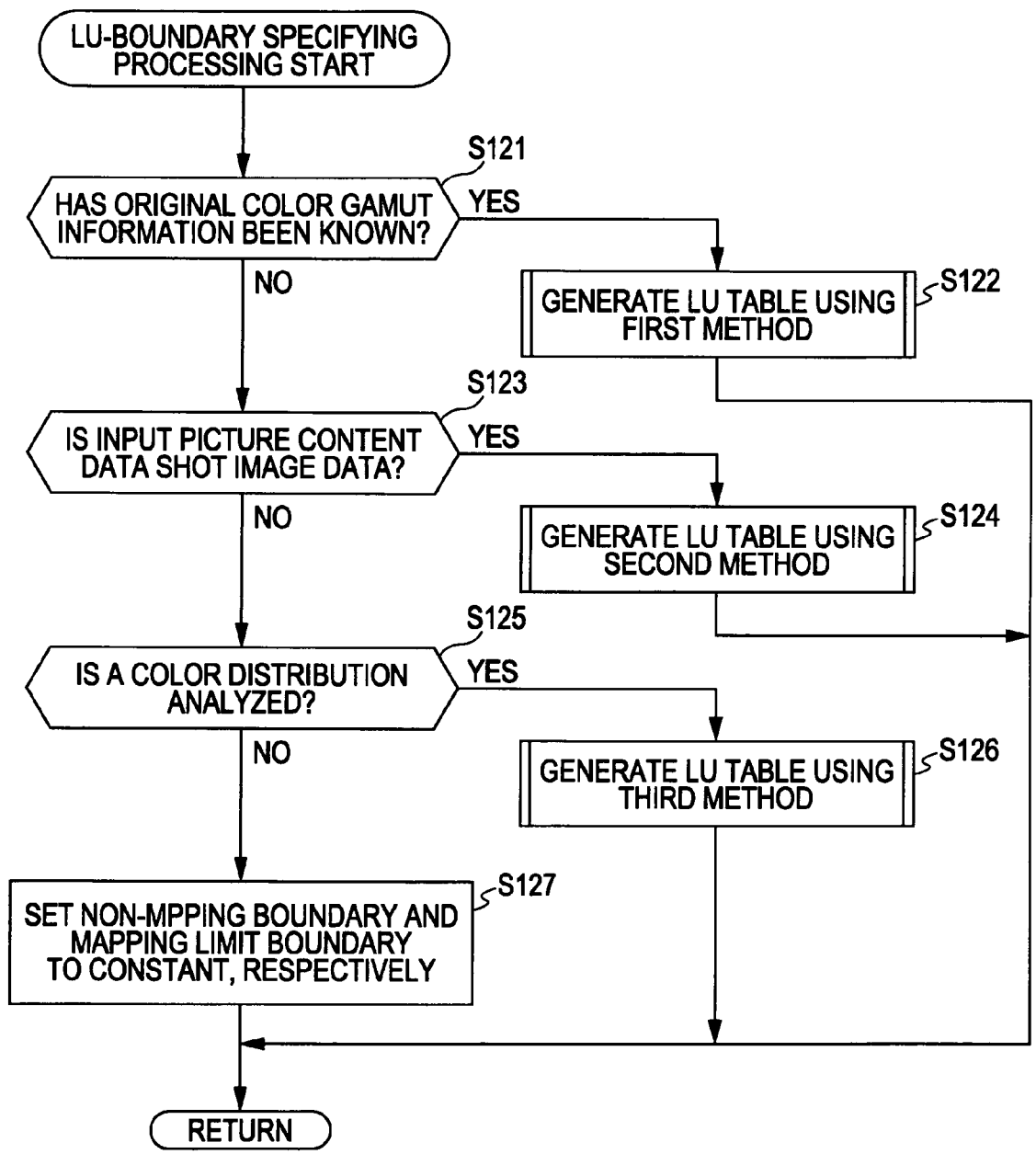
FIG. 17 is a flowchart for describing a flow example of LU-boundary specifying processing.

Further, in step S123 in FIG. 17, in a case wherein determination is made that grounds wherein the input picture content data is shot image data have not been found, and it is difficult to determine that the input picture content data is image data shot and obtained by a shooting device, the generating method selecting unit 121 advances the processing to step S125, and determines whether to analyze the color distribution of the input picture content data. In a case wherein determination is made to analyze the color distribution, the generating method selecting unit 121 advances the processing to step S126.

In step S126, the third LU-table generating unit 133 generates an LU table by using the third method. The details of the processing in step S126 will be described later. Upon the processing in step S126 being ended, the LU-boundary specifying processing is ended, the processing is returned to step S103 in FIG. 3, and the processing in step S104 and thereafter are executed.

Also, in a case wherein determination is made to perform no analyzing of the color distribution in step S125 in FIG. 17 since resources and time for analyzing the color distribution have not been ensured, the generating method selecting unit 121 advances the processing to step S127. In step S127, the constant setting unit 134 sets each of the non-mapping boundary (U-boundary) 152 and mapping limit boundary (L-boundary) 153 of all hues to a constant. Upon the processing in step S127 being ended, the LU-boundary specifying processing is ended, the processing is returned to step S103 in FIG. 3, and the processing in step S104 and thereafter are executed.

Figure 18:
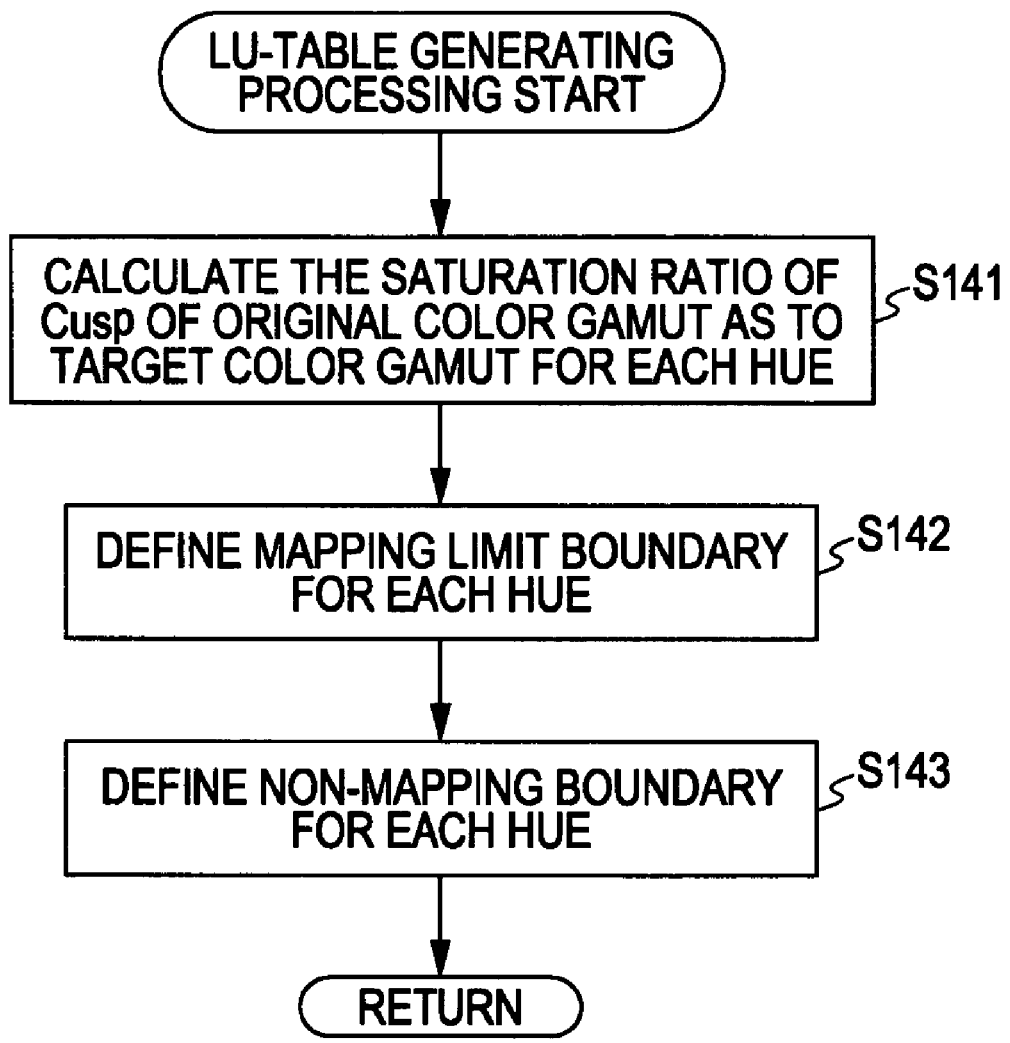
FIG. 18 is a flowchart for describing a flow example of LU-table generating processing according to a first method.
Figure 19:
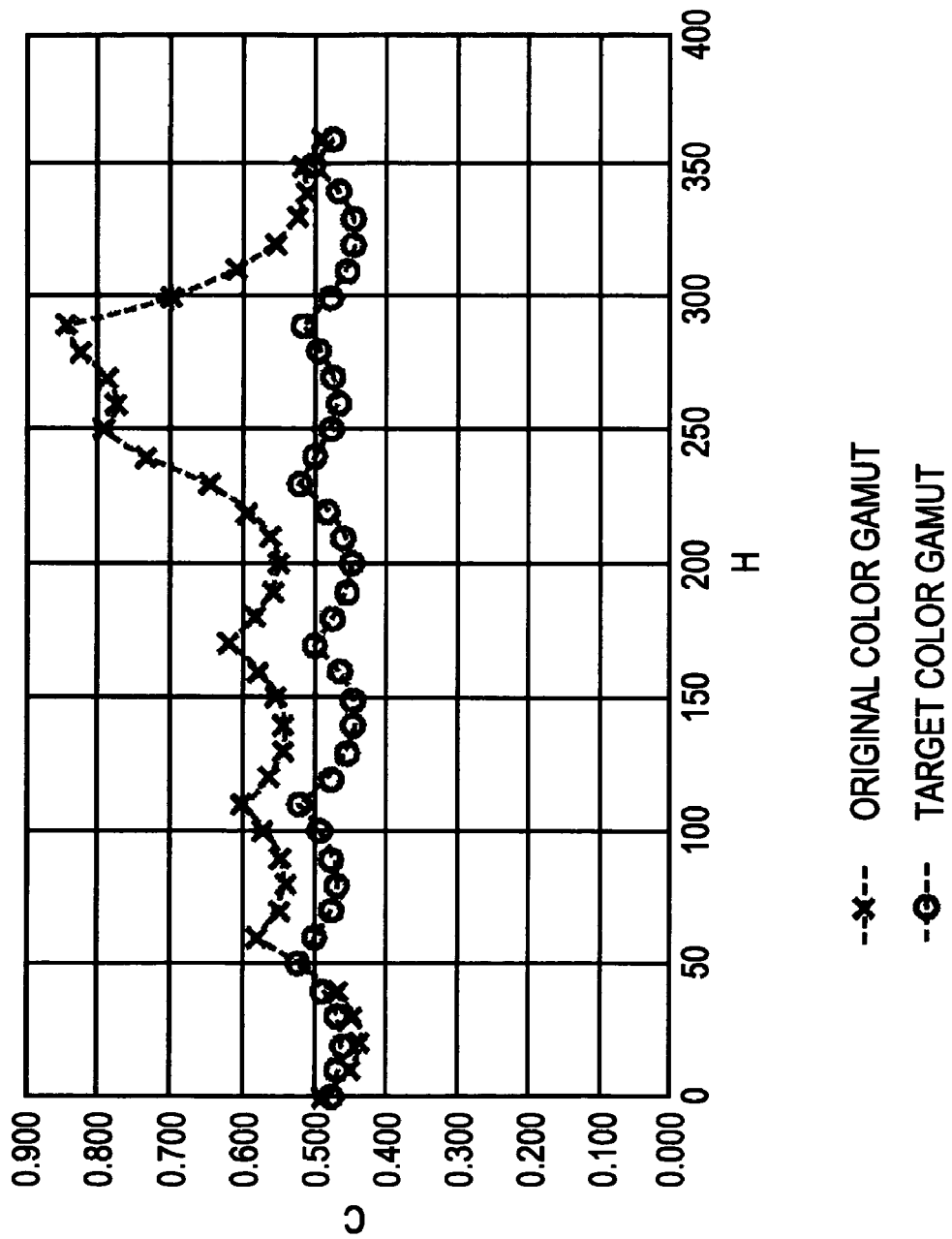
FIG. 19 is a diagram illustrating an example of a Cusp table for saturation.

Next, the first method of the LU-table generating processing executed in step S122 in FIG. 17 will be described with reference to the flowchart in FIG. 18. Also, description will be made with reference to FIGS. 19 through 22 as appropriate.

Upon the LU-table generating processing being started, in step S141 the first LU-table generating unit 131 calculates the saturation ratio of the Cusp of the original color gamut corresponding to the target color gamut for each hue.

In the case of changing the values of the L-boundary 153 and U-boundary 152 for each hue, a so-called LU table is defined. This is table information having the values of the L-boundary 153 and U-boundary 152 for each hue, whereby there can be specified whether the color gamut mapping to be performed at the hue thereof is color gamut compression or color gamut enlargement according to the value of the L-boundary 153.

If there is the original color gamut information, the expanded level of colors in the saturation direction of the picture content can be known, so the first LU-table generating unit 131 can determine the L-boundary 153 while referencing the original color gamut information. Now, let us assume that the Cusp table for saturation (C) of the original color gamut and target color gamut is in a sate such as shown in the graph shown in FIG. 19. Upon the value of the original color gamut being divided by the value of the target color gamut, there can be obtained the saturation ratio of the Cusp point of the original color gamut corresponding to the target color gamut for each hue, such as shown in the graph in FIG. 20.

A portion of which the saturation ratio is smaller than 1.0 means that the target color gamut is wider than the original color gamut, and color gamut mapping to be performed in such a case is color gamut enlargement.

In step S142, the first LU-table generating unit 131 defines the mapping limit boundary (L-boundary) 153 for each hue. For example, the first LU-table generating unit 131 can define the saturation ratio itself of each hue shown in FIG. 20 as the L-boundary 153 (saturation enlargement ratio).

Figure 20:
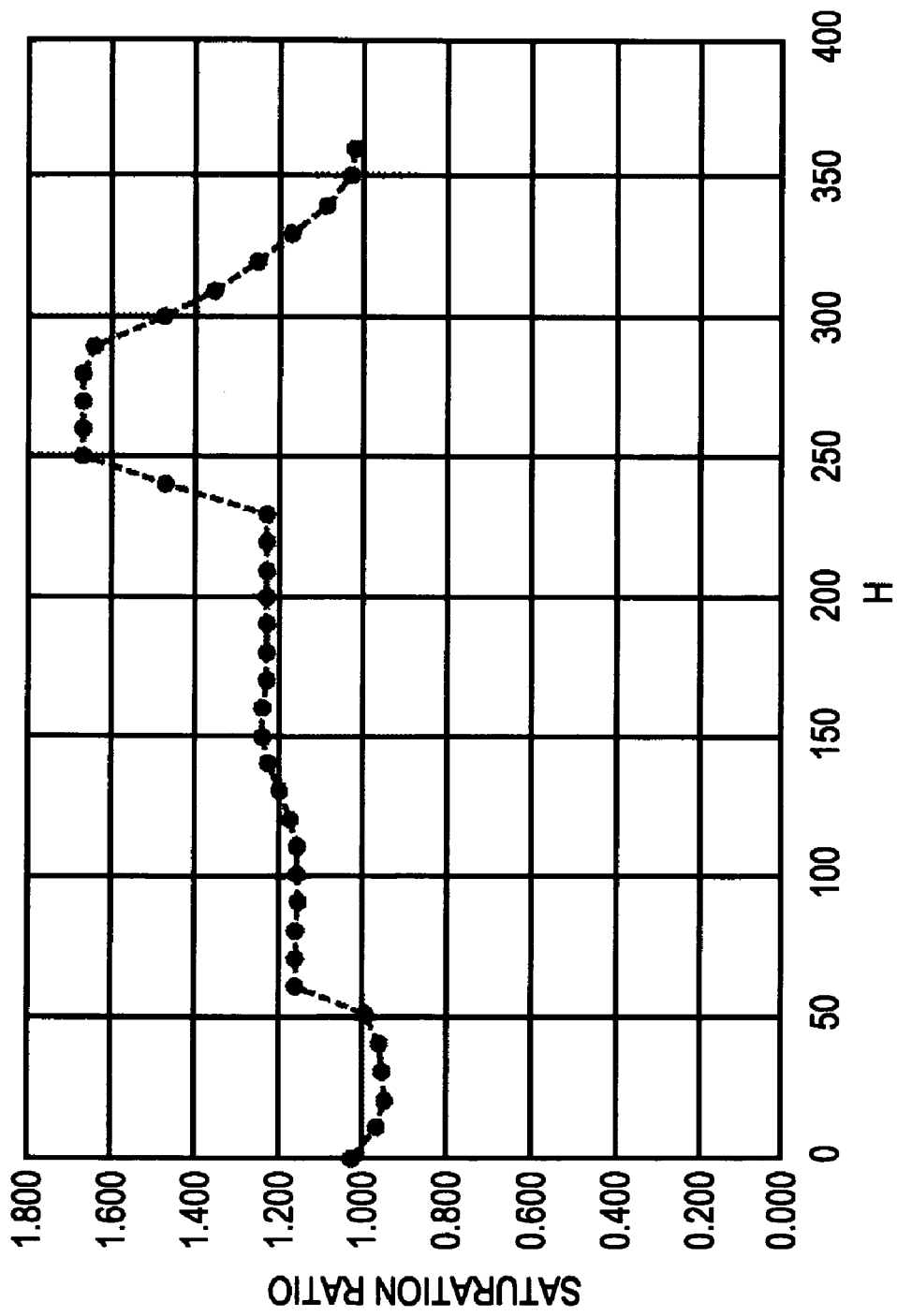
FIG. 20 is a diagram illustrating a saturation ratio example.
Figure 21:
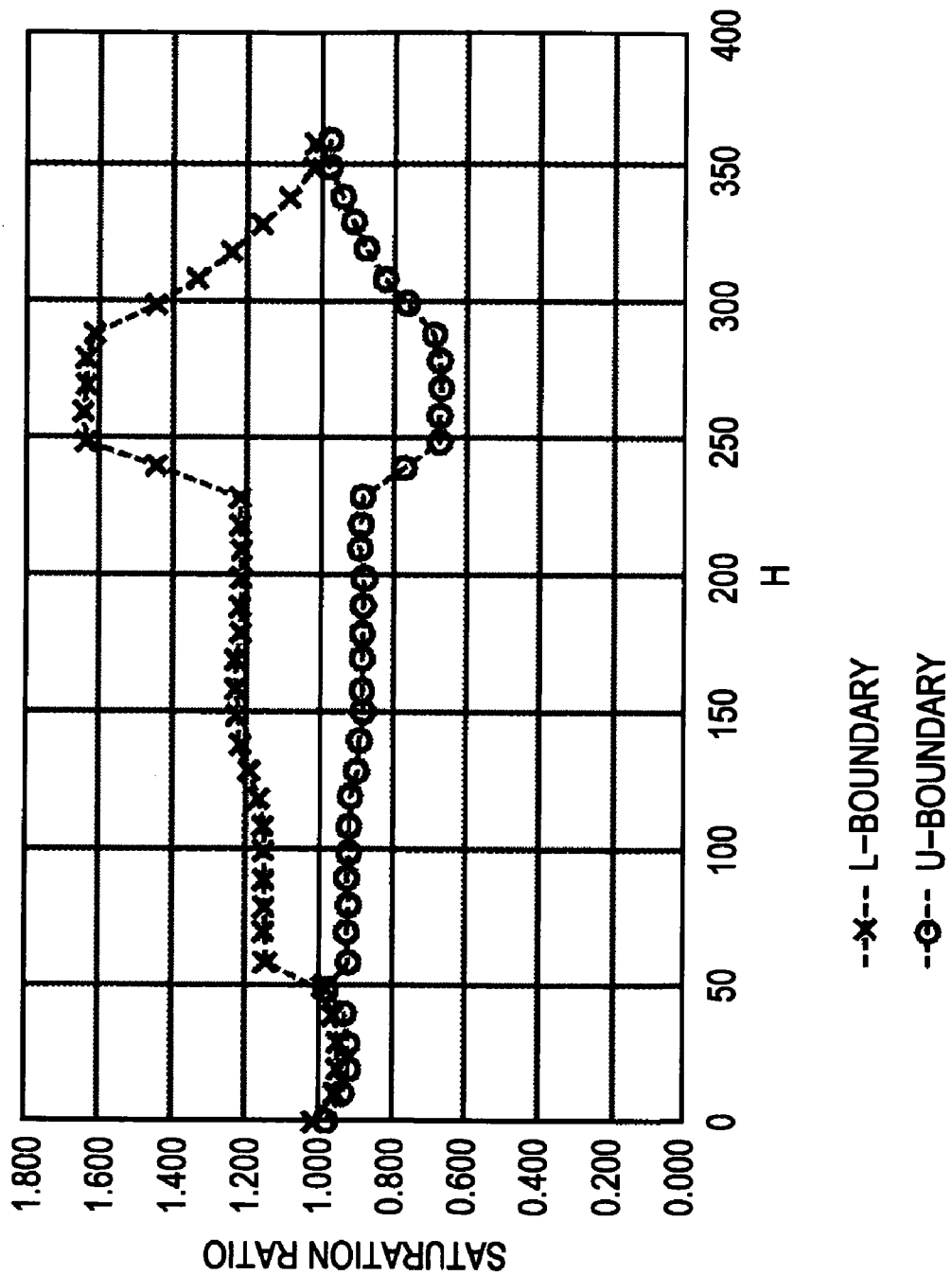
FIG. 21 is a diagram illustrating an LU table example.

In step S143, the first LU-table generating unit 131 defines the non-mapping boundary (U-boundary) 152 for each hue. Various methods can be conceived as the method for determining the U-boundary 152 (saturation reduction ratio), but there is a method for determining the U-boundary 152 in accordance with the sizes of the L-boundary 153 and T-boundary 151, for example. For example, there is a method wherein when a region to be compressed or enlarged is great, a mapping destination region is assumed to be great, and when a region to be compressed or enlarged is small, a mapping destination region is assumed to be small, and the U-boundary 152 is determined so as to hold the region ratio thereof. For example, the U-boundary 152 (saturation reduction ratio) may be a half of the L-boundary 153 (saturation enlargement ratio) at the time of color gamut compression, and the U-boundary 152 (saturation reduction ratio) may be double the L-boundary 153 (saturation enlargement ratio) at the time of color gamut enlargement. In this case, for example, when assuming that a saturation ration such as shown in FIG. 20 is given as the L-boundary 153, the first LU-table generating unit 131 generates an LU table such as shown in FIG. 21.

That is to say, the first LU-table generating unit 131 performs the processing in step S142 and processing in step s143, thereby determining both of the L-boundary 153 (saturation enlargement ratio) and U-boundary 152 (saturation reduction ratio) for each hue, and enabling an LU table to be generated. Upon generating an LU table, the first LU-table generating unit 131 ends the LU-table generating processing, returns the processing to step S122, ends the LU-boundary specifying processing, further returns the processing to step S103 in FIG. 3, and executes the processing in step S104 and thereafter.

Thus, in a case wherein both of the original color gamut and target color gamut are known, the first LU-table generating unit 131 can generate a LU table which defines the L-boundary 153 (saturation enlargement ratio) and U-boundary 152 (saturation reduction ratio) for each hue by employing the original color gamut and target color gamut thereof. Accordingly, in a case wherein both of the original color gamut and target color gamut are known, the first LU-table generating unit 131 can generate a LU table appropriately. That is to say, in a case wherein both of the original color gamut and target color gamut are known, the color conversion processing unit 103 can readily perform color gamut conversion appropriately as compared to the case of the other methods performed by the second UI-table generating unit 132 through constant setting unit 134. Also, an original color gamut does not have to be generated, so the processing load is smaller than the processing load in the second method or third method.

Figure 22:
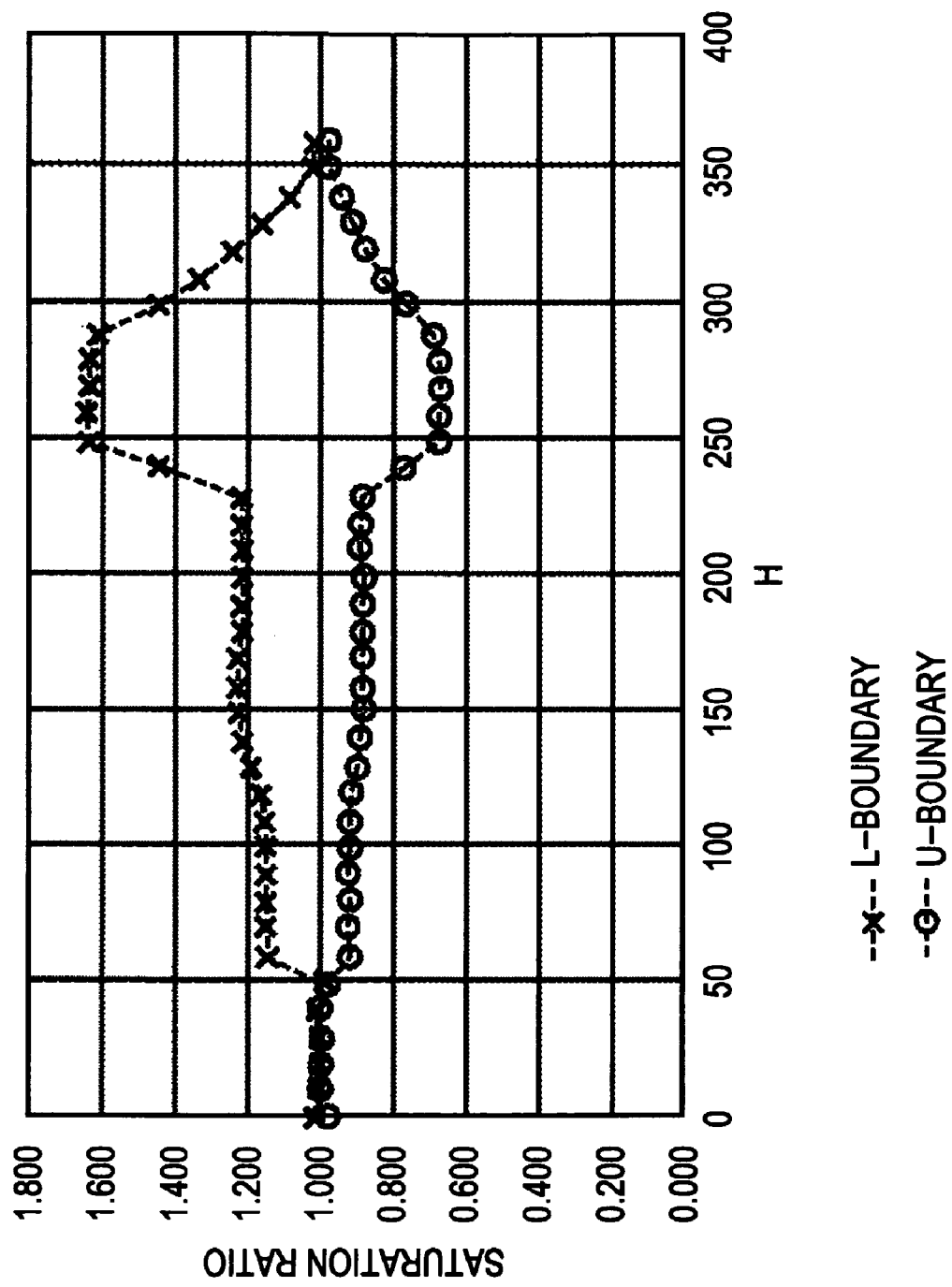
FIG. 22 is a diagram illustrating another LU table example.

Note that, for example, there is a color gamut conversion method wherein only color gamut compression for colors other than the target color gamut is performed, and color gamut enlargement for colors within the target color gamut is not performed. In such a color gamut conversion method, the first LU-table generating unit 131 sets the saturation ratio for each hue of the Cusp point to the value fixed to "1.0" of a portion of which the value is less than "1", of the saturation ratio for each hue shown in FIG. 20, as the L-boundary 153. Subsequently, upon obtaining the U-boundary 152 based on this L-boundary 153, and generating an LU table such as described above, the first LU-table generating unit 131 can obtain an LU table such as shown in FIG. 22. The color conversion processing unit 103 performs color conversion processing based on such an LU table, and further prevents mapping processing from being performed at a color gamut of a portion where the values of the L-boundary 153 and U-boundary 152 are both "1.0", whereby only color gamut compression can be performed as a whole (color conversion processing can be performed so as not to perform color gamut enlargement).

Figure 23:
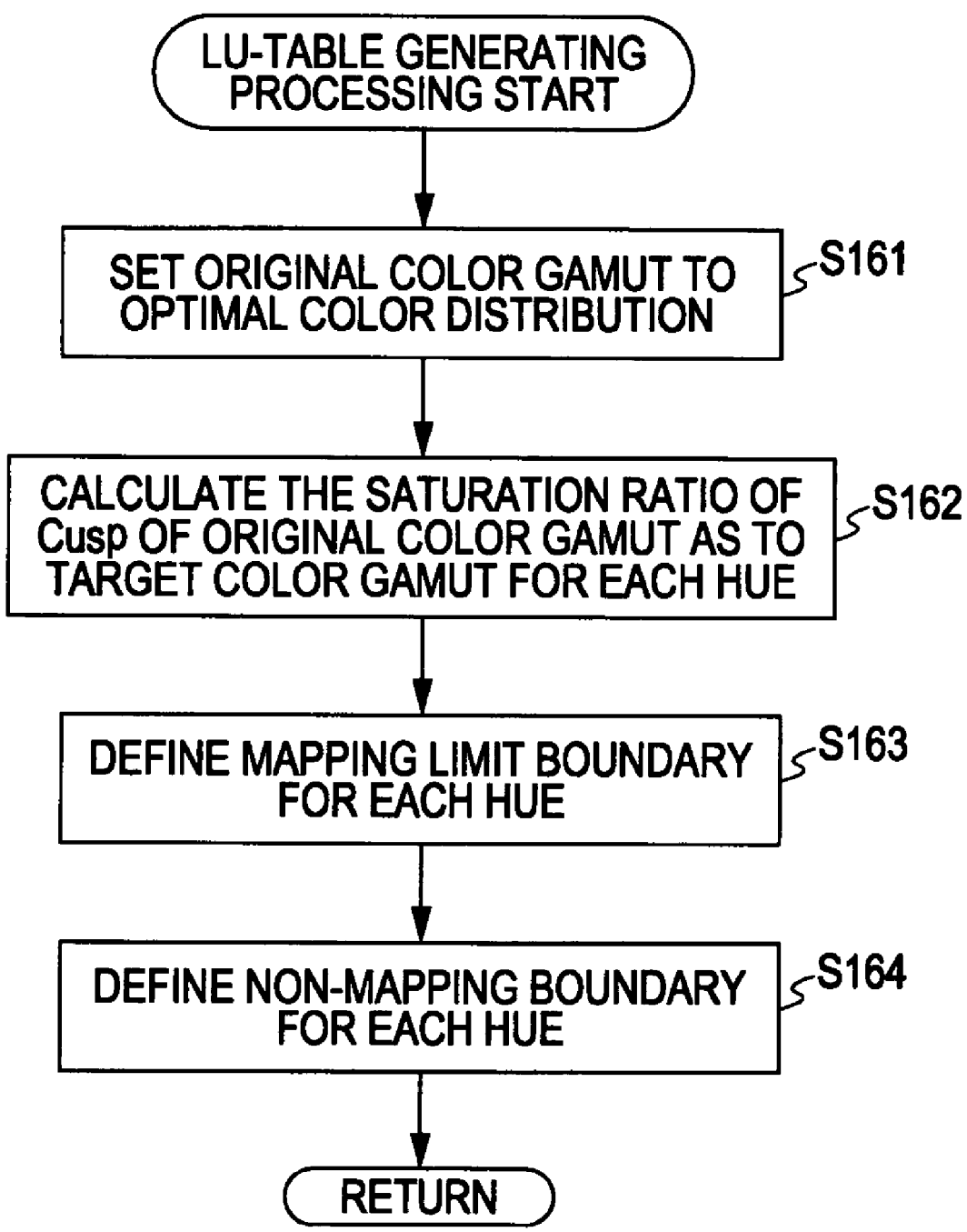
FIG. 23 is a flowchart for describing a flow example of LU-table generating processing according to a second method.

Next, the second method of the LU-table generating processing executed in step S124 in FIG. 17 will be described with reference to the flowchart in FIG. 23. Also, description will be made with reference to FIG. 24 as appropriate.

Upon the LU-table generating processing being started, in step S161 the second LU-table generating unit 132 sets an original color gamut to an optimal color distribution. In a case wherein the input picture content data is, for example, image data shot by a shooting device such as a digital camera, video camera, or the like, we can assume that the image data has a very wide color gamut. Therefore, in order to obtain a sufficient wide color gamut as the original color gamut, the second LU-table generating unit 132 sets a distribution of an optimal color which can be sensed by human eyes as the original color gamut.

Figure 24:
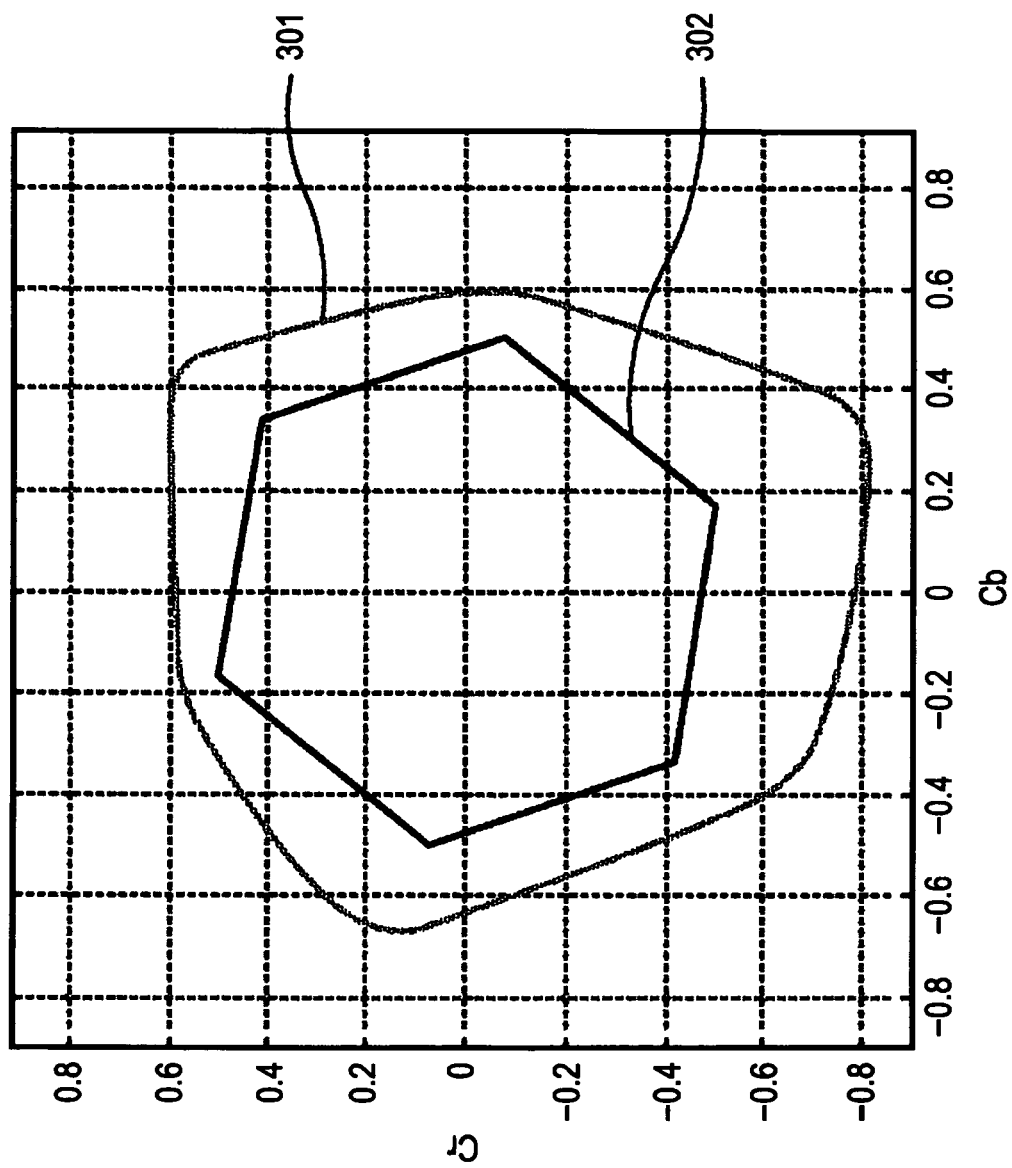
FIG. 24 is a schematic view illustrating an optimal color distribution example.

FIG. 24 illustrates a color gamut comparative diagram between an optimal color and the sRGB. As shown in FIG. 24, the color gamut of an optimal color 301 is sufficiently wider than the color gamut of sRGB 302, all hues have to be subjected to color gamut compression. However, in reality, it is effective to change a compression ratio according to a hue, and it is recommended to generate an LU table such that the compression ratio is decreased in the vicinity of a red color, and the compression ratio is increased in the vicinity of a green color, for example.

As described above, upon setting the original color gamut to an optimal color distribution, in the same way as in the case of the first method, in step S162 the second LU-table generating unit 132 calculates the saturation ratio of the Cusp point of the original color gamut as to the target color gamut for each hue, in step S163 defines the mapping limit boundary (L-boundary) 153 for each hue, in step S164 defines the non-mapping boundary (U-boundary) 152 for each hue, and generates an LU table. Upon generating an LU table, the second LU-table generating unit 132 ends the LU-table generating processing, returns the processing to step S124 in FIG. 17, ends the LU-boundary specifying processing, further returns the processing to step S103 in FIG. 3, and executes the processing in step S104 and thereafter.

Thus, even in a case wherein the original color gamut is unknown, when the input picture content data is image data shot by a shooting device, the second LU-table generating unit 132 sets the original color gamut to an optimal color distribution, whereby an LU table can be generated wherein the L-boundary 153 (saturation enlargement ratio) and U-boundary 152 (saturation reduction ratio) are defined for each hue. The second method sets the original color gamut to a predetermined color gamut, so it is not assured that all of the pixels of image data are within this original color gamut. Also, an optimal color of which the color gamut is wide is set to the original color gamut, so in a case wherein color gamut conversion is compression, there can be conceived a case wherein the compression ratio thereof becomes unnecessarily great. However, unlike the third method, the analysis of a color distribution is not performed, so the processing load can be reduced as compared to the third method. Thus, in a case wherein the original color gamut is unknown, but the input picture content data is data shot by a shooting device, the second LU-table generating unit 132 can readily generate an LU table appropriately. That is to say, in a case wherein the original color gamut is unknown, but the input picture content data is data shot by a shooting device, the color conversion processing unit 103 can readily perform color conversion appropriately.

Figure 25:
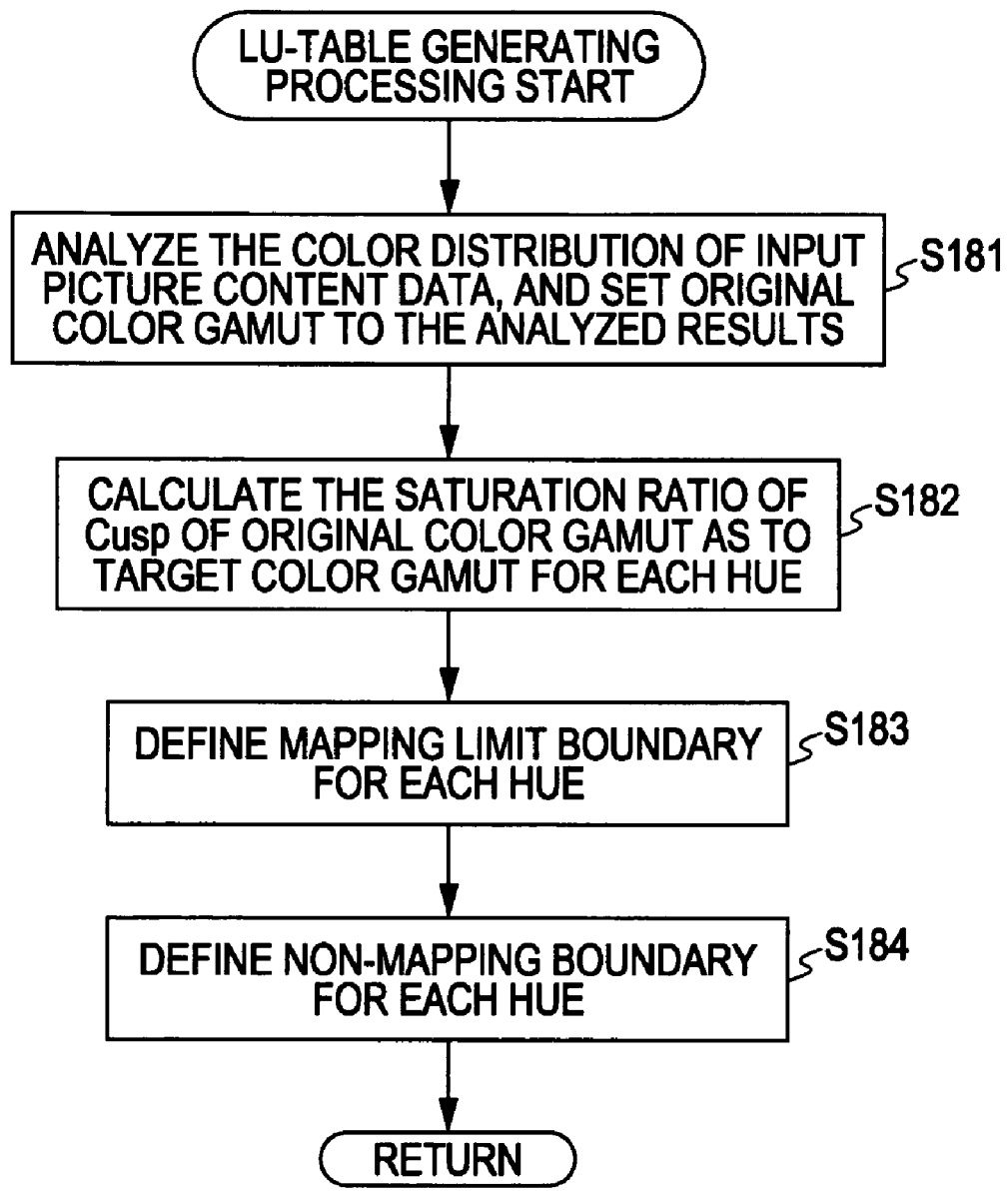
FIG. 25 is a flowchart for describing a flow example of LU-table generating processing according to a third method.

Next, the third method of the LU-table generating processing executed in step S126 in FIG. 17 will be described with reference to the flowchart in FIG. 25. Also, description will be made with reference to FIG. 26 as appropriate.

Upon the LU-table generating processing being started, in step S181 the third LU-table generating unit 133 analyzes the color distribution of input content data, and sets the original color gamut to the analysis result. For example, upon the color distribution of an image 321 in FIG. 26 being analyzed, the distribution thereof becomes a distribution chart shown in FIG. 26. When the sRGB is set to the target color gamut as to such a distribution having a great deviation, it is recommended to generate an LU table such that a part of colors have a high compression ratio.

As described above, when the color distribution of the input picture content data is analyzed, and the analysis result is set as the original color gamut, in the same way as in the first method, in step S182 the third LU-table generating unit 133 calculates the saturation ratio of the Cusp point of the original color gamut as to the target color gamut for each hue, in step S183 defines the mapping limit boundary (L-boundary) 153 for each hue, in step S184 defines the non-mapping boundary (U-boundary) 152 for each hue, and generates an LU table. Upon generating an LU table, the third LU-table generating unit 133 ends the LU-table generating processing, returns the processing to step S126 in FIG. 17, ends the LU-boundary specifying processing, further returns the processing to step S103 in FIG. 3, and executes the processing in step S104 and thereafter.

Thus, even in the event that the original color gamut is unknown, and it is difficult to determine that the input picture content data is image data shot by a shooting device, the third LU-table generating unit 133 analyzes the color distribution of the image thereof, and sets the analysis result to the original color gamut, whereby the third LU-table generating unit 133 can generate an LU table wherein the L-boundary 153 (saturation enlargement ratio) and U-boundary 152 (saturation reduction ratio) are defined for each hue. Accordingly, in the event that the original color gamut is unknown, and it is difficult to determine that the input picture content data is image data shot by a shooting device, the third LU-table generating unit 133 can generate an LU table appropriately as compared to the case wherein a constant is set to the L-boundary 153 and U-boundary 152. That is to say, in the event that the original color gamut is unknown, and it is difficult to determine that the input picture content data is image data shot by a shooting device, the color conversion processing unit 103 can perform color gamut conversion appropriately.

Note that in a case wherein it is difficult to perform any of the above-mentioned three methods, as described above, the constant setting unit 134 sets each of the L-boundary 153 (saturation enlargement ratio) and U-boundary 152 (saturation reduction ratio) to a predetermined constant which is common to all hues. That is to say, in the event that the original color gamut is unknown, it is difficult to determine that the input picture content data is image data shot by a shooting device, and color analysis of the image of the input picture content data is not performed, the constant setting unit 134 sets each of the L-boundary 153 (saturation enlargement ratio) and U-boundary 152 (saturation reduction ratio) of each hue to a uniform predetermined constant regardless of hues.

That is to say, an LU table can be generated wherein each of the values of the L-boundary 153 (saturation enlargement ratio) and U-boundary 152 (saturation reduction ratio) is constant with all hues. In the case of this method, the processing load can be reduced overwhelmingly as compared to the case of the third method. Accordingly, in the event that the original color gamut is unknown, it is difficult to determine that the input picture content data is image data shot by a shooting device, and color analysis of the image of the input picture content data is not performed, the constant setting unit 134 can readily generate an LU table. That is to say, in the event that the original color gamut is unknown, and it is difficult to determine that the input picture content data is image data shot by a shooting device, the color conversion processing unit 103 can readily perform color gamut conversion.

As described above, the color gamut conversion device 100 can select an appropriate color gamut conversion method according to a condition, and thus, color gamut conversion can be performed appropriately with more various conditions.

Note that a color gamut conversion method other than the above-mentioned methods may be employed, and any kind of method may be employed as long as the method can select a color gamut appropriately in accordance with a predetermined condition. Also, conditions for selecting each method are arbitrary.

Information processing system examples employing a color gamut conversion method such as described above are shown in FIGS. 27A through 28C.

The respective information processing systems shown in FIGS. 27A through 28C are information processing systems to which an embodiment of the present invention has been applied. The color gamut conversion such as described above is performed in the case of picture content data being exchanged between multiple devices, or in the case of expecting picture content data to be exchanged between multiple devices. With regard to a combination of devices to perform exchange of picture content data, and the exchange method thereof, there can be conceived various combinations and various methods, but in FIGS. 27A through 28C, description will be made regarding a case wherein with an information processing system configured of a supply-side device 401 for supplying picture content data, for example, through a network or the like, and an obtaining-side device 402 for obtaining the picture content data supplied through the network thereof, the color gamut conversion is performed, for convenience of explanation.

Figure 27A:
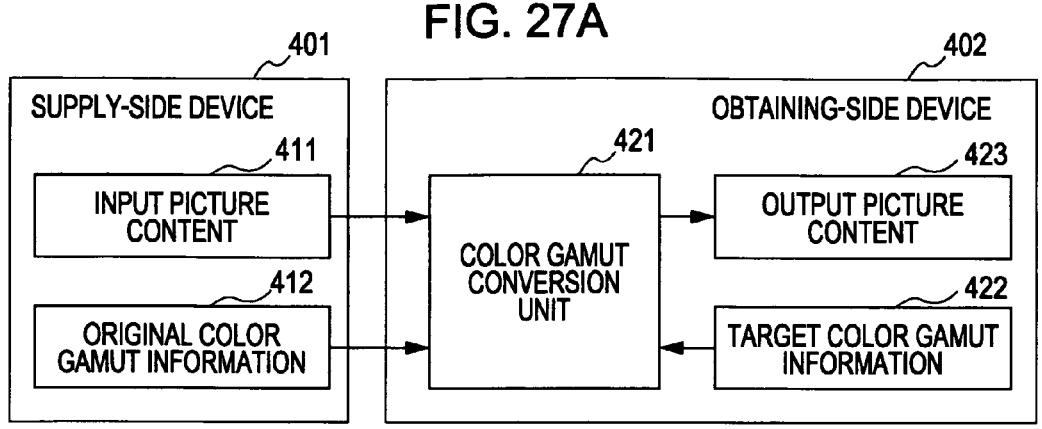
FIGS. 27A through 27C are block diagrams illustrating a configuration example of an information processing system to which an embodiment of the present invention has been applied.

FIG. 27A illustrates an example in the case of performing the color gamut conversion at the obtaining-side device 402, when both of the original color gamut information and target color gamut information are known. As shown in FIG. 27A, the supply-side device 401 supplies input picture content data 411 and original color gamut information 412 to the obtaining-side device 402, for example, through a network or the like. The obtaining-side device 402 has the same function as that of the color gamut conversion device 100 in FIG. 1, includes a color gamut conversion unit 421 for performing similar processing, and has further obtained target color gamut information 422. The color gamut conversion unit 421 performs the color gamut conversion based on the original color gamut information 412 supplied from the supply-side device 401, and the target color gamut information 422 to convert the input picture content data 411 supplied from the supply-side device 401 into output picture content data 423.

Figure 27B:
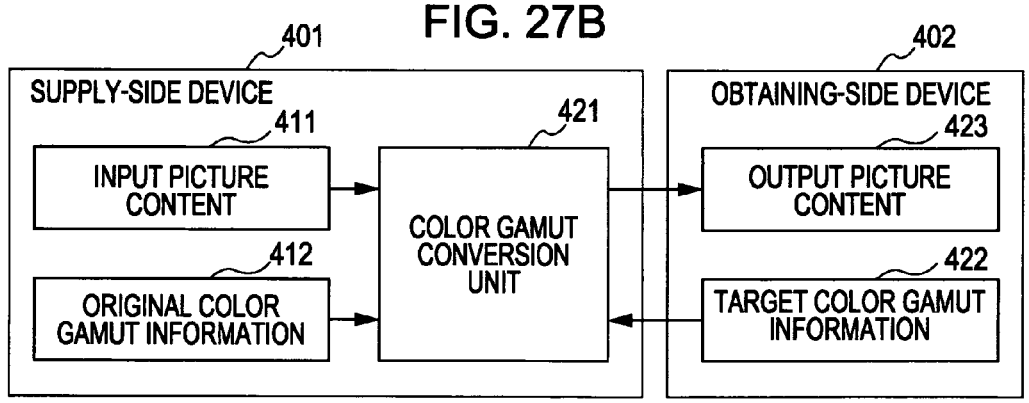

FIG. 27B illustrates an example in the case of performing the color gamut conversion at the supply-side device 401, when both of the original color gamut information and target color gamut information are known. As shown in FIG. 27B, the supply-side device 401 includes the color gamut conversion unit 421, and has obtained the input picture content data 411 and original color gamut information 412. Also, the obtaining-side device 402 supplies the target color gamut information 422 to the supply-side device 401, for example, through a network or the like. The color gamut conversion unit 421 performs the color gamut conversion based on the original color gamut information 412, and the target color gamut information 422 supplied from the obtaining-side device 402 to convert the input picture content data 411 into output picture content data 423. The supply-side device 401 supplies the converted output picture content data 423 to the obtaining-side device 402.

Figure 27C:
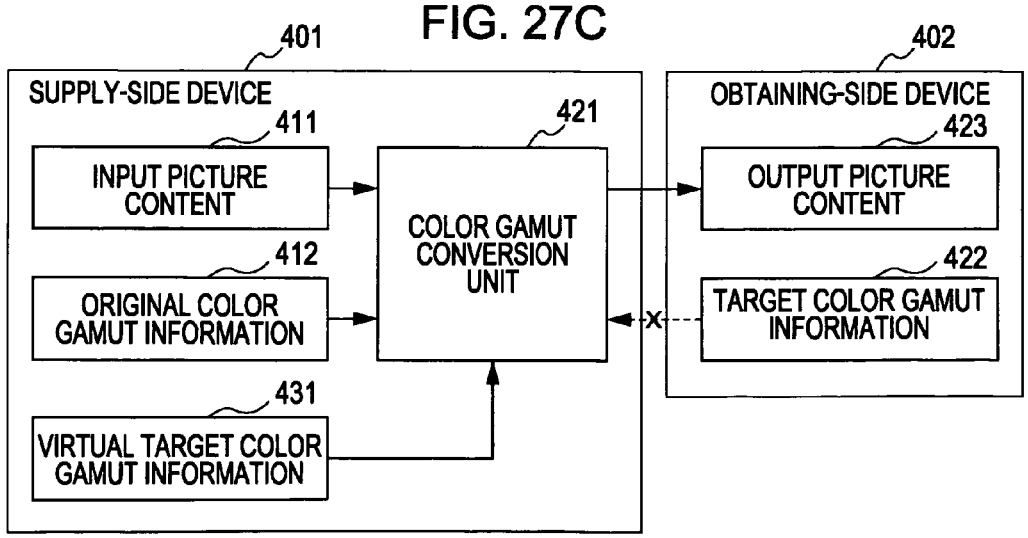

FIG. 27C illustrates an example in the case of performing the color gamut conversion at the supply-side device 401, when the original color gamut information is known, but the target color gamut information is unknown. As shown in FIG. 27C, in the same way as in the case of FIG. 27B, the supply-side device 401 includes the color gamut conversion unit 421, and has obtained the input picture content data 411 and original color gamut information 412. However, let us say that the target color gamut information 422 is unable to be obtained from the obtaining-side device 402. In such a case, the maximum saturation point calculating unit 102 of the color gamut conversion unit 421 sets tentative target color gamut information 431. The color gamut conversion unit 421 performs the color gamut conversion based on the original color gamut information 412, and tentative target color gamut information 431 thereof to convert the input picture content data 411 into output picture content data 423. The supply-side device 401 supplies the converted output picture content data 423 to the obtaining-side device 402, for example, through a network or the like.

Figure 28A:
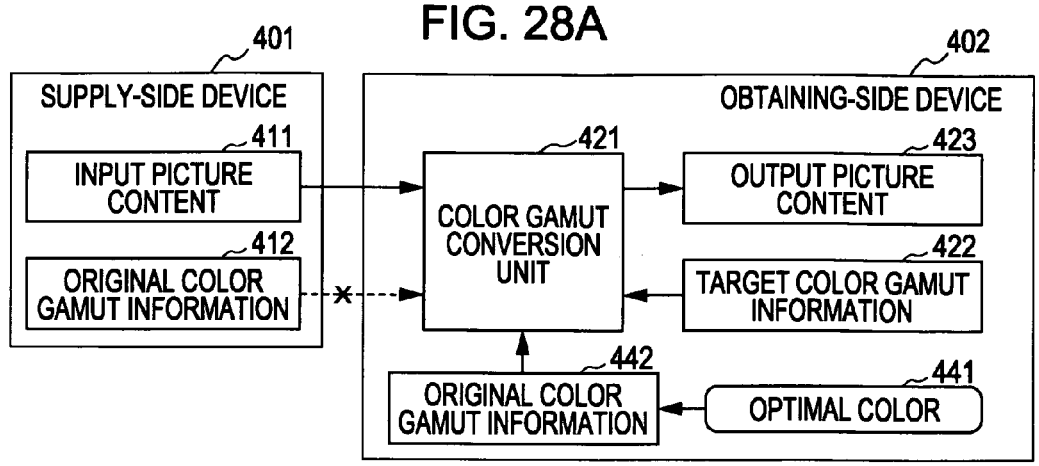
FIGS. 28A through 28C are block diagrams illustrating a configuration example of an information processing system to which an embodiment of the present invention has been applied.

FIG. 28A illustrates an example in the case of performing the color gamut conversion at the obtaining-side device 402, when the target color gamut information is known, but the original color gamut information is unknown, and further the supply-side device 401 is a shooting device. As shown in FIG. 28A, the supply-side device 401 which is a shooting device supplies shot and obtained input picture content data 411 to the obtaining-side device 402, for example, through a network or the like. The obtaining-side device 402 includes the color gamut conversion unit 421, and has further obtained the target color gamut information 422. The color gamut conversion unit 421 is unable to obtain the original color gamut information 412 from the supply-side device 401, so assumes that the original color gamut of the supply-side device which is a shooting device is sufficiently wide, sets original color gamut information 442 to an optimal color 441, performs the color gamut conversion based on the original color gamut information 442 and target color gamut information 422 to convert the input picture content data 411 supplied from the supply-side device 401 into output picture content data 423.

Figure 28B:
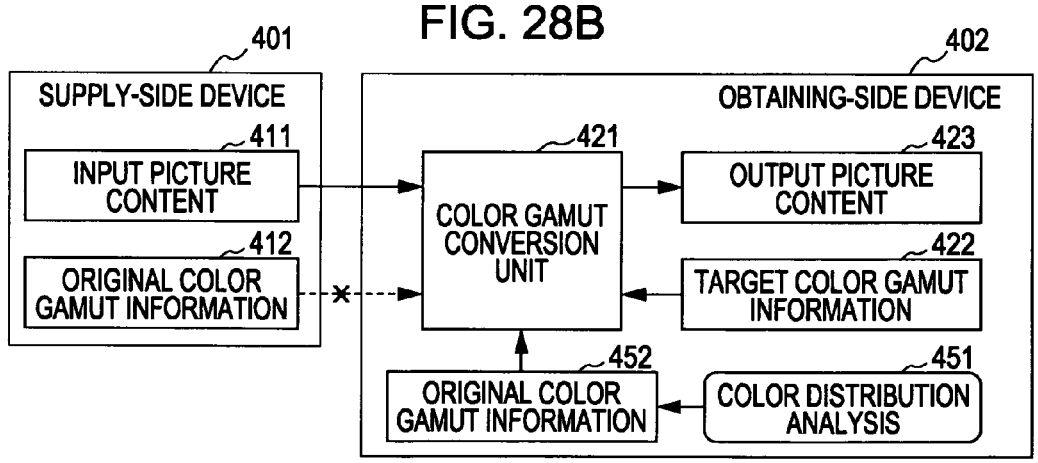

FIG. 28B illustrates an example in the case of performing the color gamut conversion at the obtaining-side device 402, when the target color gamut information is known, but the original color gamut information is unknown, and further, it is unable to be concluded that the supply-side device 401 is a shooting device. As shown in FIG. 28B, the supply-side device 401 supplies the input picture content data 411 to the obtaining-side device 402, for example, through a network or the like. The obtaining-side device 402 includes the color gamut conversion unit 421, and has further obtained the target color gamut information 422. However, the color gamut conversion unit 421 is unable to obtain the original color gamut information 412 from the supply-side device 401, and is also unable to conclude that the supply-side device 401 is a shooting device, so analyzes the color distribution of the input picture content data 411 supplied from the supply-side device 401, sets original color gamut information 452 based on the analysis result thereof, performs the color gamut conversion based on the original color gamut information 452 thereof and target color gamut information 422 to convert the input picture content data 411 supplied from the supply-side device 401 into output picture content data 423.

Figure 28C:
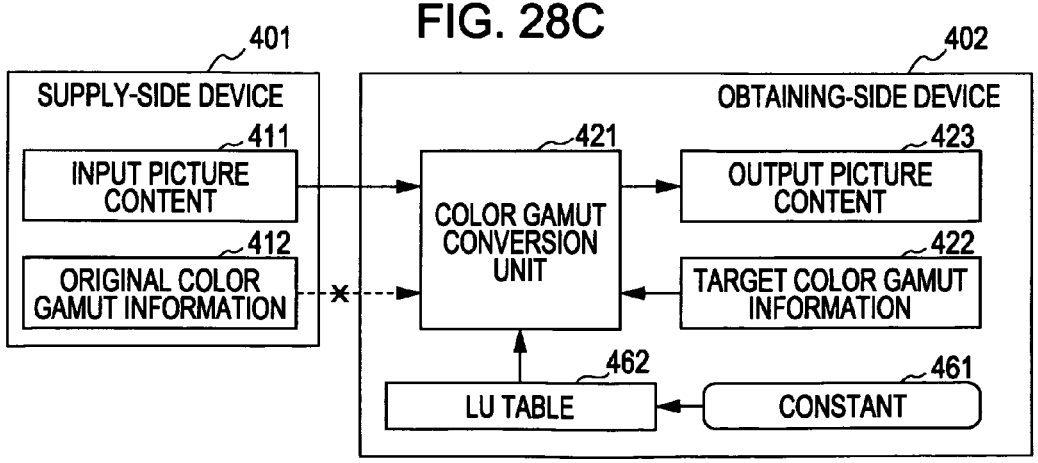

FIG. 28C illustrates an example in the case of performing the color gamut conversion at the obtaining-side device 402, when the target color gamut information is known, but the original color gamut information is unknown, and further, it is unable to be concluded that the supply-side device 401 is a shooting device, and also color distribution analysis is not performed. As shown in FIG. 28C, the supply-side device 401 supplies the input picture content data 411 to the obtaining-side device 402, for example, through a network or the like. The obtaining-side device 402 includes the color gamut conversion unit 421, and has further obtained the target color gamut information 422. However, the original color gamut information 412 is unable to be obtained from the supply-side device 401, and it is also unable to be concluded that the supply-side device 401 is a shooting device, and also the analysis of the color distribution of the input picture content data 411 is not performed. Therefore, the color gamut conversion unit 421 generates an LU table 462 of which the values are common to all hues by setting each of the L-boundary 153 (saturation enlargement ratio) and U-boundary 152 (saturation reduction ratio) to a predetermined constant 461, performs the color gamut conversion by using the LU table 462 to convert the input picture content data 411 supplied from the supply-side device 401 into output picture content data 423.

As described above, the present invention may be applied to any kind of device as long as the device has the same configuration as that of the color gamut conversion device 100 in FIG. 1, and includes the color gamut conversion unit 421 for performing similar processing. That is to say, for example, as described with reference to FIGS. 27A through 28C, the color gamut conversion unit 421 can select an appropriate color gamut conversion method according to a device and conditions, and can perform the color gamut conversion appropriately according to more various conditions.

The above-mentioned series of processing can be executed not only by hardware but also by software. In this case, for example, the above-mentioned series of processing may be configured as a personal computer such as shown in FIG. 29.

Figure 29:
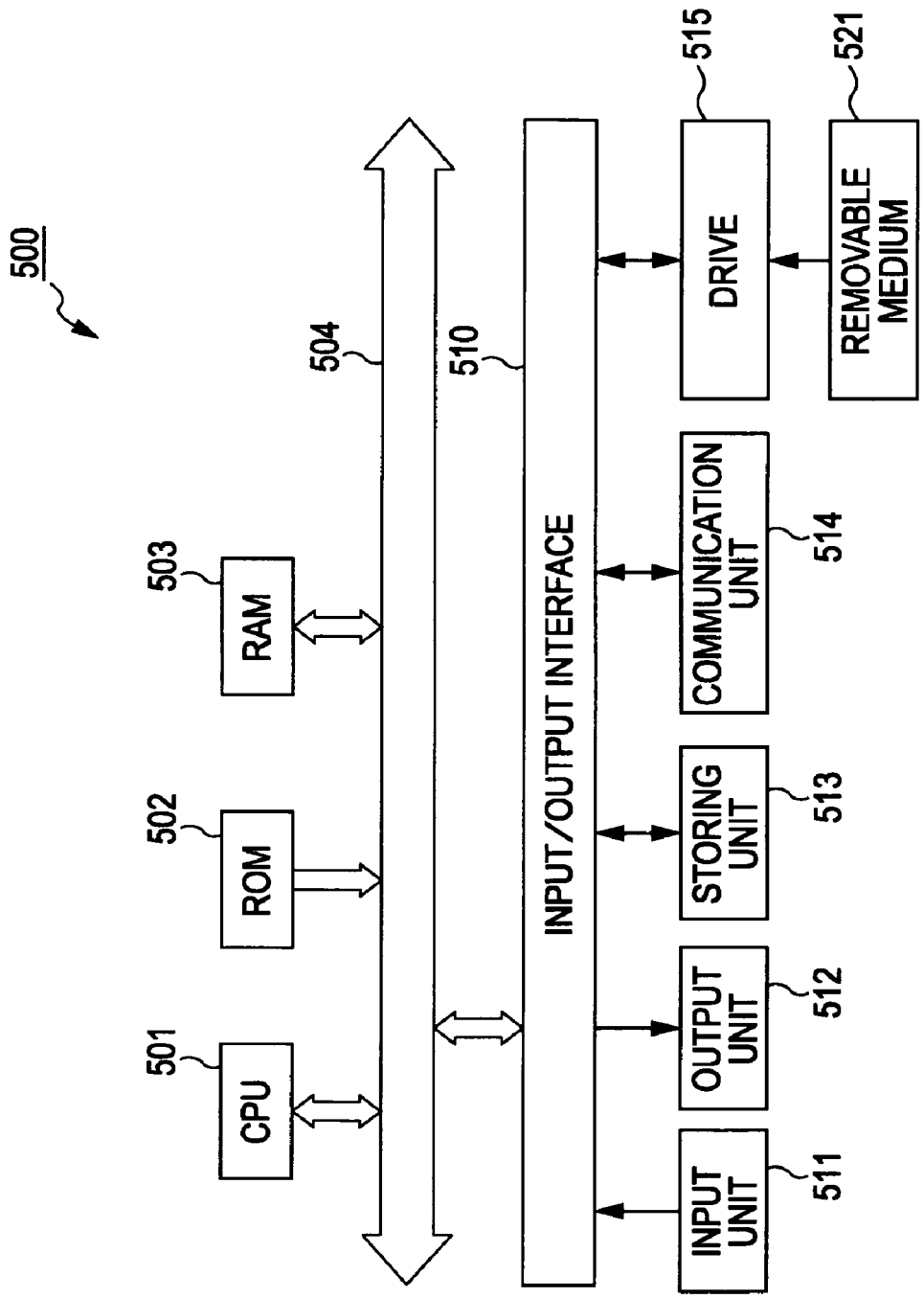
FIG. 29 is a block diagram illustrating a configuration example of a personal computer to which an embodiment of the present invention has been applied.

In FIG. 29, a CPU (Central Processing Unit) 501 of a personal computer 500 executes various types of processing in accordance with a program stored in ROM (Read Only Memory) 502, or a program loaded into RAM (Random Access Memory) 503 from a storing unit 513. Data or the like used by the CPU 501 to execute various types of processing is also stored in the RAM 503 as appropriate.

The CPU 501, ROM 502, and RAM 503 are mutually connected through a bus 504. An input/output interface 510 is also connected to the bus 504.

The input/output interface 510 is connected with an input unit 511 made up of a keyboard, mouse, and so forth, a display made up of CRT (Cathode Ray Tube), LCD (Liquid Crystal Display), or the like, an output unit 512 made up of a speaker and so forth, a storing unit 513 configured of a hard disk or the like, and a communication unit 514 configured of a modem or the like. The communication unit 514 performs communication processing through a network including the Internet.

The input/output interface 510 is also connected with a drive 515 as appropriate, on which a removable medium 521 such as a magnetic disk, optical disc, magneto-optical disk, semiconductor, or the like is mounted as appropriate, and a computer program read out therefrom is installed into the storing unit 513 as appropriate.

In a case wherein the above-mentioned series of processing is executed by software, a program making up the software thereof is installed from a network or recording medium.

The recording medium is not restricted to being configured of, separately from the device main unit such as shown in FIG. 29, the removable medium 521 made up of a magnetic disk (including a flexible disk), optical disc (including CD-ROM (Compact Disc-Read Only Memory), DVD (Digital Versatile Disc)), magneto-optical disk (including MD (Mini Disc)), semiconductor memory, or the like wherein a program to be distributed to a user is recorded, but also my be the ROM 502, a hard disk included in the storing unit 513, or the like wherein a program to be distributed to a user in a state built into a device main unit beforehand is recorded.

Note that, with the present Specification, steps describing a program to be recorded in a recording medium include not only processing performed in time series along a described order but also processing executed in parallel or individually not necessarily performed in time series.

Also, with the present Specification, the term "system" represents the entirety of equipment configured of multiple devices.

Note that the configuration described above as a single device may be configured as multiple devices. Conversely, the configuration described above as multiple devices may be configured as a single device collectively. Also, a configuration other than the above-mentioned configuration may be added to the configuration of each device. Further, if the configuration and operation as the entire system are substantially the same, a part of the configuration of a certain device may be included in another device. That is to say, embodiments of the present invention are not restricted to the above-mentioned embodiment, and various changes can be made without departing from the essence and spirit of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device configured to perform color gamut conversion for compressing or enlarging the color gamut of image data, comprising:
    selecting means configured to select a generating method of table information for specifying a non-mapping boundary which is a boundary between a region where the coordinate movement of a pixel to be processed is not performed, and a conversion source region where the coordinate movement of said pixel to be processed is performed, and a mapping limit boundary which is a boundary other than said non-mapping region, of said conversion source region, for each hue, from a plurality of generating methods according to a predetermined condition, with said color gamut conversion; and
    table information generating means configured to generate said table information using the method selected from said plurality of generating methods,
    the plurality of generating methods comprising at least a first method, a second method, a third method, and a fourth method, the first method being used when original color gamut information of the image data is known, the second method being used when the original color gamut information of the image data is not known and a determination is made that the image data is shot image data, the third method being used when the original color gamut information of the image data is not known, a determination is not made that the image data is shot image data, and a determination is made to analyze a color distribution of the image data, and the fourth method being used when none of the first, second, and third methods are used, further comprising:
    transform function defining means configured to define a transform function wherein a situation of said color gamut conversion is converted into a function;
    virtual clip boundary determining means configured to determine a virtual clip boundary which is a boundary serving as a candidate of the coordinate movement destination of said pixel to be processed; and
    mapping processing means configured to dispose said pixel to be processed on the virtual clip boundary which has been determined.

2. An information processing system in which a supply-side device transmits image data to an obtaining-side device, and performs color gamut conversion for compressing or enlarging the color gamut of said image data, said supply-side device includes
    supplying means configured to supply said image data to said obtaining-side device,
    and said obtaining-side device includes
    obtaining means configured to obtain said image data supplied from said supply-side device, selecting means configured to select a generating method of table information for specifying a non-mapping boundary which is a boundary between a region where the coordinate movement of a pixel to be processed is not performed, and a conversion source region where the coordinate movement of said pixel to be processed is performed, and a mapping limit boundary which is a boundary other than said non-mapping region, of said conversion source region, for each hue, from a plurality of generating methods according to a predetermined condition, with said color gamut conversion, table information generating means configured to generate said table information using the method selected from said plurality of generating methods, and color gamut conversion means configured to perform the color gamut conversion of said image data using said table information which has been generated, the plurality of generating methods comprising at least a first method, a second method, a third method, and a fourth method, the first method being used when original color gamut information of the image data is known, the second method being used when the original color gamut information of the image data is not known and a determination is made that the image data is shot image data, the third method being used when the original color gamut information of the image data is not known, a determination is not made that the image data is shot image data, and a determination is made to analyze a color distribution of the image data, and the fourth method being used when none of the first, second, and third methods are used.

3. An information processing system in which a supply-side device transmits image data to an obtaining-side device, and performs color gamut conversion for compressing or enlarging the color gamut of said image data, said supply-side device includes selecting means configured to select a generating method of table information for specifying a non-mapping boundary which is a boundary between a region where the coordinate movement of a pixel to be processed is not performed, and a conversion source region where the coordinate movement of said pixel to be processed is performed, and a mapping limit boundary which is a boundary other than said non-mapping region, of said conversion source region, for each hue, from a plurality of generating methods according to a predetermined condition, with said color gamut conversion, table information generating means configured to generate said table information using the method selected from said plurality of generating methods, color gamut conversion means configured to perform the color gamut conversion of said image data using said table information which has been generated, and supplying means configured to supply said image data subjected to color gamut conversion to said obtaining-side device, and said obtaining-side device includes obtaining means configured to obtain said image data subjected to color gamut conversion, supplied from said supply-side device, the plurality of generating methods comprising at least a first method, a second method, a third method, and a fourth method, the first method being used when original color gamut information of the image data is known, the second method being used when the original color gamut information of the image data is not known and a determination is made that the image data is shot image data, the third method being used when the original color gamut information of the image data is not known, a determination is not made that the image data is shot image data, and a determination is made to analyze a color distribution of the image data, and the fourth method being used when none of the first, second, and third methods are used.

4. An information processing system in which a supply-side device transmits image data to an obtaining-side device, and performs color gamut conversion for compressing or enlarging the color gamut of said image data, said supply-side device includes a supplying unit configured to supply said image data to said obtaining-side device, and said obtaining-side device includes an obtaining unit configured to obtain said image data supplied from said supply-side device, a selecting unit configured to select a generating method of table information for specifying a non-mapping boundary which is a boundary between a region where the coordinate movement of a pixel to be processed is not performed, and a conversion source region where the coordinate movement of said pixel to be processed is performed, and a mapping limit boundary which is a boundary other than said non-mapping region, of said conversion source region, for each hue, from a plurality of generating methods according to a predetermined condition, with said color gamut conversion, a table information generating unit configured to generate said table information using the method selected from said plurality of generating methods, and a color gamut conversion unit configured to perform the color gamut conversion of said image data using said table information which has been generated, the plurality of generating methods comprising at least a first method, a second method, a third method, and a fourth method, the first method being used when original color gamut information of the image data is known, the second method being used when the original color gamut information of the image data is not known and a determination is made that the image data is shot image data, the third method being used when the original color gamut information of the image data is not known, a determination is not made that the image data is shot image data, and a determination is made to analyze a color distribution of the image data, and the fourth method being used when none of the first, second, and third methods are used.

5. An information processing system in which a supply-side device transmits image data to an obtaining-side device, and performs color gamut conversion for compressing or enlarging the color gamut of said image data, said supply-side device includes a selecting unit configured to select a generating method of table information for specifying a non-mapping boundary which is a boundary between a region where the coordinate movement of a pixel to be processed is not performed, and a conversion source region where the coordinate movement of said pixel to be processed is performed, and a mapping limit boundary which is a boundary other than said non-mapping region, of said conversion source region, for each hue, from a plurality of generating methods according to a predetermined condition, with said color gamut conversion, a table information generating unit configured to generate said table information using the method selected from said plurality of generating methods, a color gamut conversion unit configured to perform the color gamut conversion of said image data using said table information which has been generated, and a supplying unit configured to supply said image data subjected to color gamut conversion to said obtaining-side device, and said obtaining-side device includes an obtaining unit configured to obtain said image data subjected to color gamut conversion, supplied from said supply-side device, the plurality of generating methods comprising at least a first method, a second method, a third method, and a fourth method, the first method being used when original color gamut information of the image data is known, the second method being used when the original color gamut information of the image data is not known and a determination is made that the image data is shot image data, the third method being used when the original color gamut information of the image data is not known, a determination is not made that the image data is shot image data, and a determination is made to analyze a color distribution of the image data, and the fourth method being used when none of the first, second, and third methods are used.

* * * * *